(12) United States Patent
Jang et al.

(10) Patent No.: US 7,171,816 B2
(45) Date of Patent: Feb. 6, 2007

(54) AIR CONDITIONER

(75) Inventors: Ho Geun Jang, Kimhae-shi (KR); Dong Jin Kwak, Changwon-shi (KR); Min Chul Cho, Busankwangyeok-shi (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 10/450,564

(22) PCT Filed: Dec. 14, 2001

(86) PCT No.: PCT/KR01/02173

§ 371 (c)(1),
(2), (4) Date: Apr. 29, 2004

(87) PCT Pub. No.: WO02/48617

PCT Pub. Date: Jun. 20, 2002

(65) Prior Publication Data

US 2004/0231344 A1 Nov. 25, 2004

(30) Foreign Application Priority Data

Dec. 16, 2000 (KR) .............................. 2000-77492
May 9, 2001 (KR) .............................. 2001-25180

(51) Int. Cl.
*F24F 3/16* (2006.01)
*F25D 17/00* (2006.01)

(52) U.S. Cl. ........................................... 62/78; 62/177

(58) Field of Classification Search ................... 62/78, 62/177
See application file for complete search history.

(56) References Cited

U.S. PATENT DOCUMENTS

| 4,896,514 A | | 1/1990 | Sugiyama |
| 5,170,637 A | * | 12/1992 | Shyu .......................... 62/176.1 |
| 5,428,964 A | * | 7/1995 | Lobdell ...................... 62/176.6 |
| 5,890,366 A | | 4/1999 | Yang |

FOREIGN PATENT DOCUMENTS

JP 3-75423 3/1991

* cited by examiner

Primary Examiner—Cheryl Tyler
Assistant Examiner—Michael J. Early
(74) Attorney, Agent, or Firm—McKenna Long & Aldridge LLP

(57) ABSTRACT

An air conditioner is disclosed to supply a room with oxygen as well as control temperature and humidity of the air. The present invention includes an outdoor module 10, an indoor module 20, a refrigerant tube 30, and an oxygen generating module. The oxygen generating module includes an oxygen generator 100 installed at the outdoor module 10 so as to generate oxygen by in-taking outdoor air, an oxygen exhauster 200 installed in the indoor module 20 so as to exhaust the oxygen, and an oxygen transport tube 300 transporting the oxygen generated from the oxygen generator 100 to the oxygen exhauster 200.

46 Claims, 17 Drawing Sheets

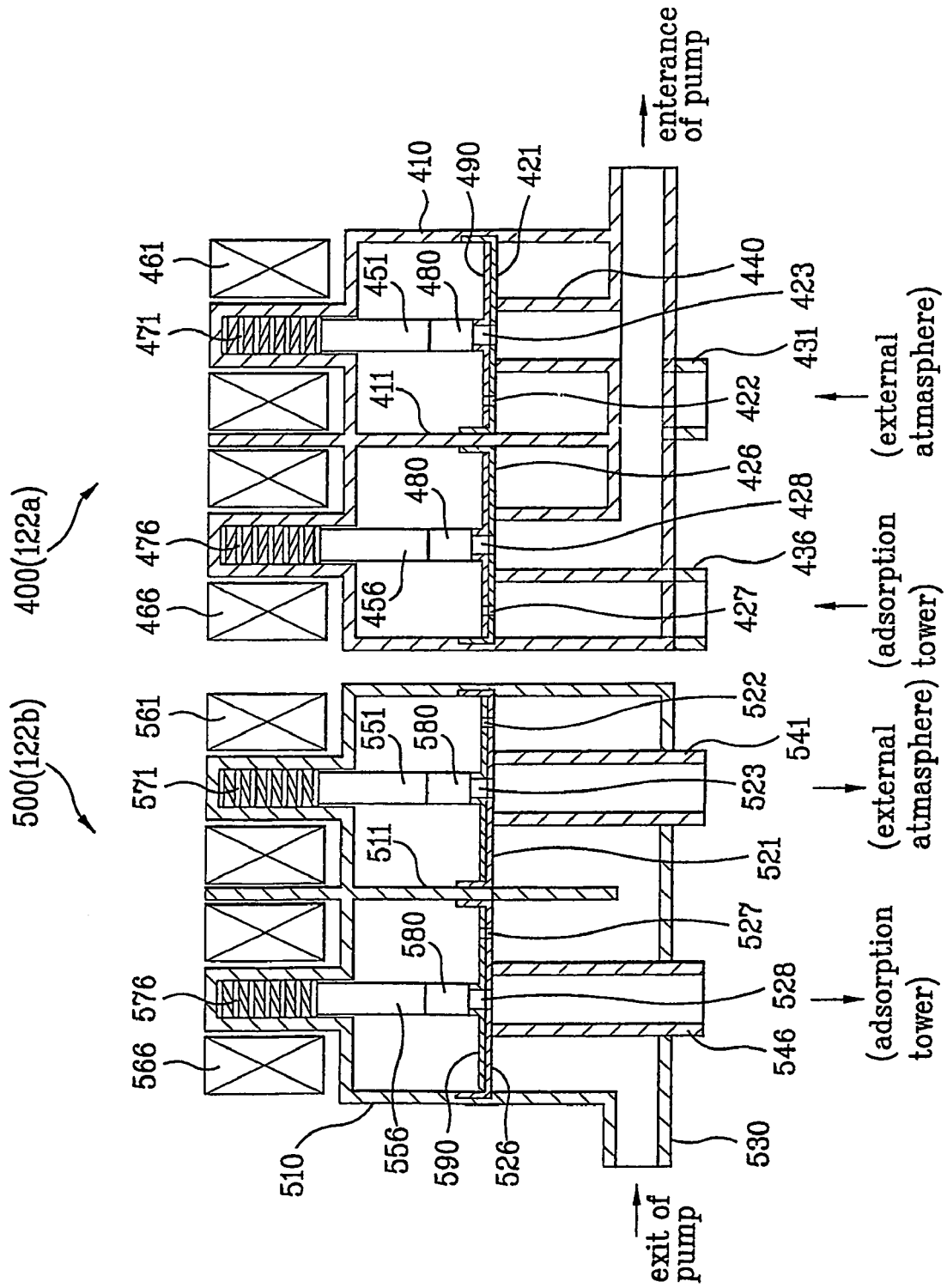

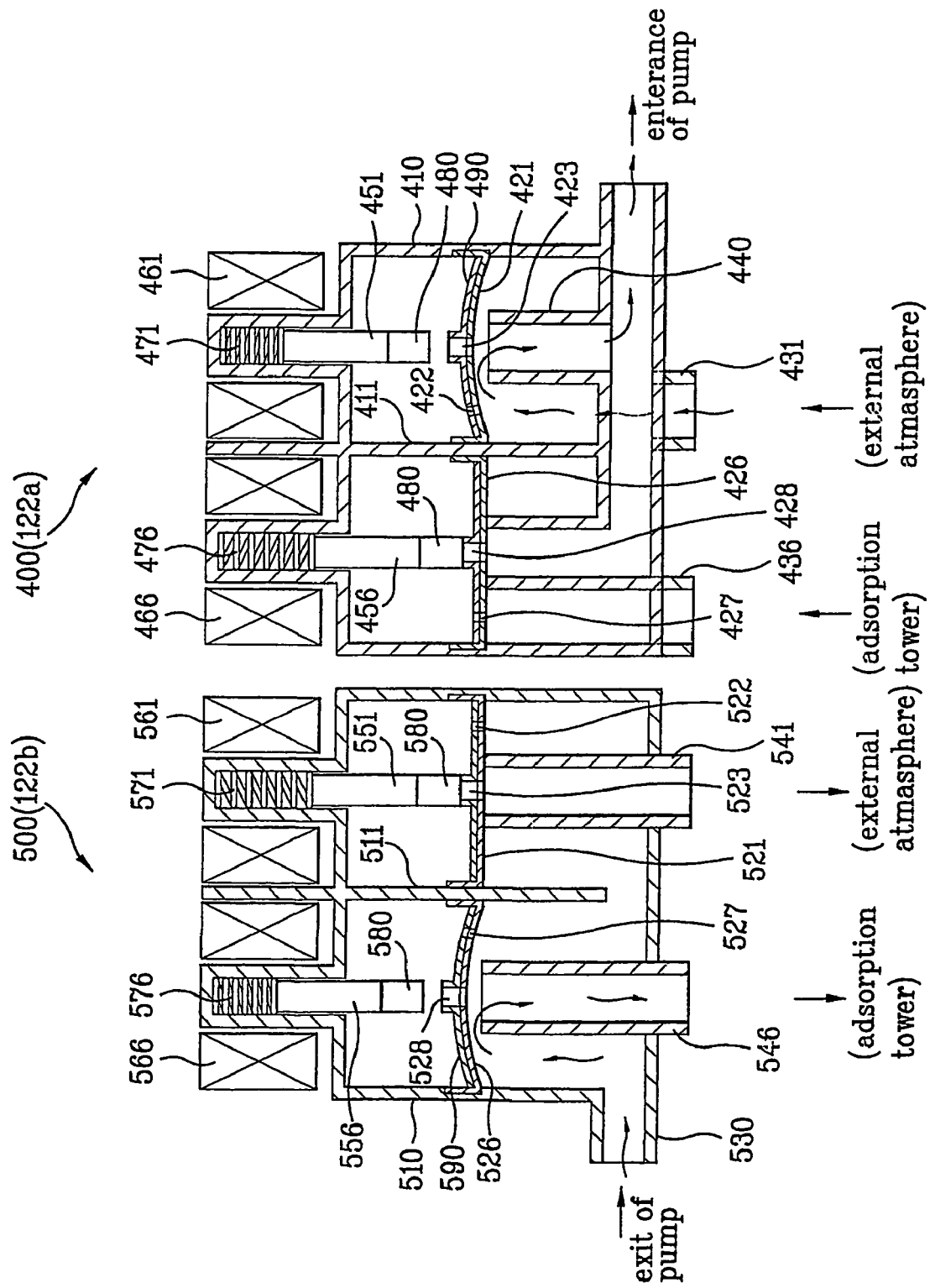

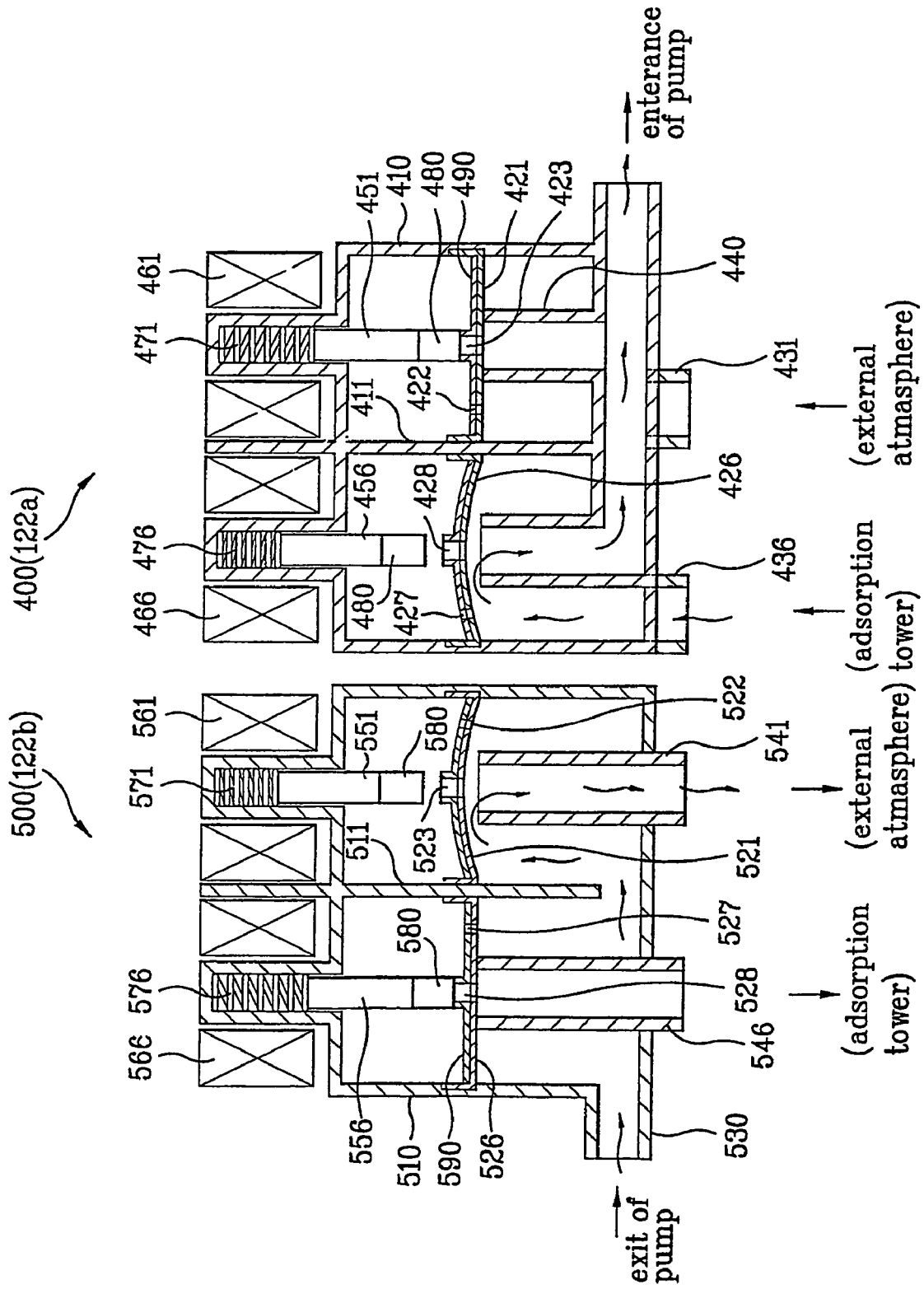

AIR CONDITIONER

TECHNICAL FIELD

The present invention relates to an air conditioner, and more particularly, to an air conditioner enabling to supply a room with oxygen good for a human body as well as control temperature and humidity of air therein.

BACKGROUND ART

Generally, an air conditioner keeps a predetermined temperature and humidity of air in the room by heat-exchange of a working fluid, i.e., a refrigerant. And, there are a variety of a separating type air conditioner, a window type air conditioner, and the like.

Lately, an air conditioner requires complex and additional functions besides a basic function of air conditioning. For instance, an air conditioner having a negative ion generator is commercialized. The negative ion generating air conditioner operates to supply a room with negative ions good for health as well as cool air.

Further, air conditioners having more-complex functions are currently developed, and such development increases in connection with a diverse user's demand and advanced technologies thereof.

DISCLOSURE OF INVENTION

Accordingly, the present invention is directed to an air conditioner that substantially obviates one or more problems due to limitations and disadvantages of the related art.

An object of the present invention is to provide an air conditioner enabling to supply a room with oxygen effectively.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air conditioner according to the present invention includes an outdoor module including a condenser, an outdoor fan, and a compressor so as to condense a refrigerant, an indoor module including an evaporator, an indoor fan, an inlet and an outlet so as cool to discharge air in a room, a refrigerant tube connecting the evaporator to the condenser so as to circulate the refrigerant, and an oxygen generating module comprising: an oxygen generator installed at a random place of the outdoor module and generating oxygen by inhaling (i.e. in-taking) external air; an oxygen exhauster installed in the indoor module and discharging the oxygen; and an oxygen transport tube transporting the oxygen generated from the oxygen generator to the oxygen exhauster, wherein the oxygen generator and the oxygen exhauster are separated from each other in and outside the room, respectively so as to supply the room with the oxygen without altering a structure of the air conditioner.

Preferably, the oxygen generator includes a driving part comprising a plurality of components so as to generate the oxygen, and an exterior part protecting the driving part.

More preferably, the driving part includes an adsorption tower charged with a predetermined adsorbent, an air pump circulating air compulsorily so as to provide the adsorption tower with a pressurizing or vacuum state, first and second switch valves connected to an entrance and an exit of the air pump, respectively, connected to an entrance of the adsorption tower, and providing air fluid paths selectively so as to inhale the external air and exhale internal air, a check valve installed at the oxygen transport tube connected to the exit of the adsorption tower so as to permit a flow in a discharging direction only, a first fluid path connecting the entrance of the air pump, the first switch valve, and the entrance of the adsorption tower reciprocally, a second fluid path connecting the exit of the air pump, the second switch valve, and the entrance of the adsorption tower reciprocally, a first air tube diverging from the first switch valve on the first fluid path so as to be interconnected to an external atmosphere, and a second air tube diverging from the second switch valve on the second fluid path so as to be interconnected to the external atmosphere, wherein the oxygen is generated from an inflow of air or nitrogen is detached from the adsorbent in accordance with the pressurizing or vacuum state of the adsorption tower.

More preferably, the air conditioner further includes a control part controlling operations of the first and second switch valves and the pump so that the driving part makes an inner part of the adsorption tower be in the pressurizing or vacuum state.

More preferably, the air conditioner further includes a signal output part outputting a predetermined signal to the control part so that the driving part controls a relating operation part.

More preferably, the signal output part is a timer measuring a time after a switching operation for pressure state variation at the inner part of the adsorption tower.

More preferably, the signal output part is a gas sensor measuring a concentration of a predetermined gas in the room.

More preferably, the predetermined gas measured by the sensor is carbon dioxide.

More preferably, the signal output part is a key input part outputting an operational signal to the control part in direct by a user's manipulation.

More preferably, the control part repeats the pressurizing and vacuum states at the inner part of the adsorption tower periodically in accordance with a setup time.

More preferably, the first and second switch valves connect the air tubes coupled with themselves and the pump each other or the adsorption tower and the pump each other.

More preferably, the control part repeats the pressurizing and vacuum states periodically so as to maintain an atmospheric state for a predetermined time prior to the pressurizing and vacuum states(the control part maintains the inner part of the adsorption tower for a predetermined time as an atmospheric state prior to the pressurizing and vacuum states).

More preferably, the first and second switch valves connect selectively two of the air tubes connected to the first and second switch valves, the pump, and the adsorption tower.

More preferably, the first switch valve includes a case body having a vertical wall partitioning one inner end, horizontal materials installed at spaces partitioned by the vertical wall respectively and having inflow holes and outflow holes through which air flows in and out respectively, first and second inhale tubes interconnected to the inflow holes, respectively, an exhale (i.e. discharge) tube interconnected to the respective outflow holes in common, and an opening/shutting means opening and shutting the respective outflow holes.

More preferably, the second switch valve includes a case body having a vertical wall partitioning one inner end, horizontal materials installed at spaces partitioned by the vertical wall respectively and having inflow holes and outflow holes through which air flows in and out respectively, an inhale tube interconnected to the respective inflow holes in common, first and second exhale tubes interconnected to the outflow holes, respectively, and an opening/shutting means opening and shutting the respective outflow holes.

More preferably, the first inhale tube and the second inhale tube are connected to the external atmosphere and the adsorption tower, respectively and wherein the exhale tube is connected to the entrance of the pump.

More preferably, the inhale tube is connected to the exit of the pump and wherein the first and second exhale tubes are connected to the adsorption tower and the external atmosphere.

More preferably, the opening/shutting means includes opening/shutting materials opening and shutting the outflow holes, respectively, electromagnetic materials moving the opening/shutting materials by electromagnetic force, respectively, and elastic materials returning the opening/shutting materials to original positions, respectively.

More preferably, packing materials are coupled with tips of the opening/shutting materials, respectively.

More preferably, each of the horizontal materials is made of a flexible substance.

More preferably, a figure-maintaining material is coupled with each of the horizontal materials so as to sustain a figure of the corresponding horizontal material.

More preferably, the first and second air tubes merge into one so as to be interconnected to the external atmosphere.

More preferably, the oxygen generator is placed at a top of the outdoor module.

More preferably, the oxygen generator is placed at the top of the outdoor module so as to be separated therefrom.

More preferably, the exterior part of the oxygen generator includes a support plate fixed to the top of the outdoor module and supporting the driving part, and a housing fixed to the support plate so as to cover to protect the driving part.

More preferably, the support plate comprises a predetermined-sized penetrating hole and the top of the outdoor module has a counter predetermined-sized penetrating hole corresponding to the penetrating hole of the support plate, and wherein the support plate is placed near the compressor inside the outdoor module so that hole-organs of the driving part sucks air of high temperature through the penetrating holes.

More preferably, the oxygen generator is built in one body with the top of the outdoor module.

More preferably, the exterior part of the oxygen generator is installed over a driving part of the outdoor module and wherein the exterior part comprises a separating plate supporting to fix the driving part of the oxygen generator and a housing covering to protect the driving parts of the oxygen generator and outdoor module.

More preferably, the separating plate further comprises a penetrating hole having a predetermined size and wherein the separating plate is placed near the compressor so that hole-organs of the driving part sucks air of high temperature through the penetrating holes.

More preferably, the outdoor module further includes a fixing material attached to a surface of the compressor or around the compressor so as to fix the hole-organs near the compressor stably.

Preferably, the oxygen transport tube is arranged so as to be adjacent to a portion of the refrigerant tube at which the refrigerant returns from the evaporator to the compressor.

Preferably, the oxygen exhauster further comprises an oxygen discharge part connected to the oxygen transport tube so as to discharge the oxygen, and wherein the oxygen discharge part is installed in front of or at a rear of the evaporator in accordance with a direction of air discharged from the indoor module.

More preferably, the oxygen exhauster further comprises an oxygen generating display part attached to a surface of the outdoor module and connected to the oxygen transport tube so as to display an oxygen exhaust status.

More preferably, the oxygen generating display part includes a body of which one end is connected to the oxygen transport tube and of which other end is connected to the oxygen exhauster wherein an oxygen fluid path is formed between both of the ends, a transparent window attached at a front of the body so as to show the oxygen path of the body, and a float inserted to float in the oxygen fluid path in accordance with a flow of the oxygen.

In another aspect of the present invention, a method of generating oxygen in an air conditioner includes the steps of adjusting an inner part of an adsorption tower to have an atmospheric state by interconnecting the adsorption tower to an external atmosphere when an oxygen generating module is actuated, decompressing the inner part of the adsorption tower to have a setup degree of vacuum so as to detach nitrogen from an adsorbent in the adsorption tower, readjusting the inner part of the adsorption tower to have the atmospheric state by interconnecting the adsorption tower to the external atmosphere, and pressurizing the inner part of the adsorption tower to have a setup pressure so as to extract oxygen from air using the adsorbent.

Preferably, the decompressing step and the pressurizing step are carried out in reverse order(the pressurizing step is carried out after the atmospheric adjustment step and the decompressing step is carried out after the atmospheric readjustment step).

Preferably, the decompressing, atmospheric adjustment, and pressurizing steps are repeated in order when the oxygen generating module operates.

Preferably, the atmospheric adjustment, decompressing, and pressurizing steps are controlled by a predetermined control part and a signal output part measuring a time after an operational control by the control part.

More preferably, the atmospheric adjustment and readjustment steps including the steps of switching switch valves so that the adsorption tower is interconnected to the external atmosphere in direct by the control part, outputting a time after switching the switch valves which is measured by the signal output part to the control part, and maintaining the inner part of the adsorption tower to have the atmospheric state for a setup time by comparing the setup time in the control part to the measured time of the signal output part.

More preferably, the decompressing step includes the steps of switching switch valves so as to form a fluid path extending from the adsorption tower to an external air through a pump by the control part, measuring a time after the switching step by the signal output part, operating the pump so that an internal air of the adsorption tower is discharged along the fluid path, and maintaining to operate the pump for a setup decompressing time by comparing the setup decompressing time in the control part to the measured time of the signal output part.

More preferably, the pressurizing step includes the steps of switching switch valves so as to form a fluid path extending from an external air to the adsorption tower through a pump by the control part, measuring a time after the switching step by the signal output part, operating the pump so that the adsorption tower is supplied with the external air along the fluid path, and maintaining to operate the pump for a setup pressurizing time by comparing the setup pressurizing time in the control part to the measured time of the signal output part.

Preferably, the decompressing and pressurizing steps are controlled by a predetermined control part and a signal output part measuring a gas concentration in a room.

More preferably, the decompressing step includes the steps of switching switch valves so as to form a fluid path extending from the adsorption tower to an external air through a pump by the control part, measuring the gas concentration in the room after the switching step by the signal output part, operating the pump so that an internal air of the adsorption tower is discharged along the fluid path, and maintaining to operate the pump to reach a setup maximum gas concentration by comparing the setup maximum gas concentration in the control part to the measured concentration of the signal output part.

More preferably, the pressurizing step includes the steps of switching switch valves so as to form a fluid path extending from an external air to the adsorption tower through a pump by the control part, measuring the gas concentration in the room after the switching step by the signal output part, operating the pump so that the adsorption tower is supplied with the external air along the fluid path, and maintaining to operate the pump to reach a setup minimum gas concentration by comparing the setup minimum gas concentration in the control part to the measured gas concentration of the signal output part.

Preferably, the decompressing and pressurizing steps are controlled by a predetermined control part and a signal output part enabling a user to select the decompressing step and the pressurizing step in direct.

The air conditioner according to the present invention enables to have an air supply function without changing an additional design by applying the oxygen generating module having a structure easy to install.

Moreover, the oxygen generating module is interoperated with the air conditioner, thereby improving a performance.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a cross-sectional view of a modified switch valve applied to a driving part of an oxygen generator;

FIG. 6A and FIG. 6B illustrate cross-sectional views of operating the modified switch valve in FIG. 5;

BEST MODE FOR CARRYING OUT THE INVENTION

Reference will now be made in detail to the preferred embodiments of the present invention, examples of which are illustrated in the accompanying drawings.

Figure 1:
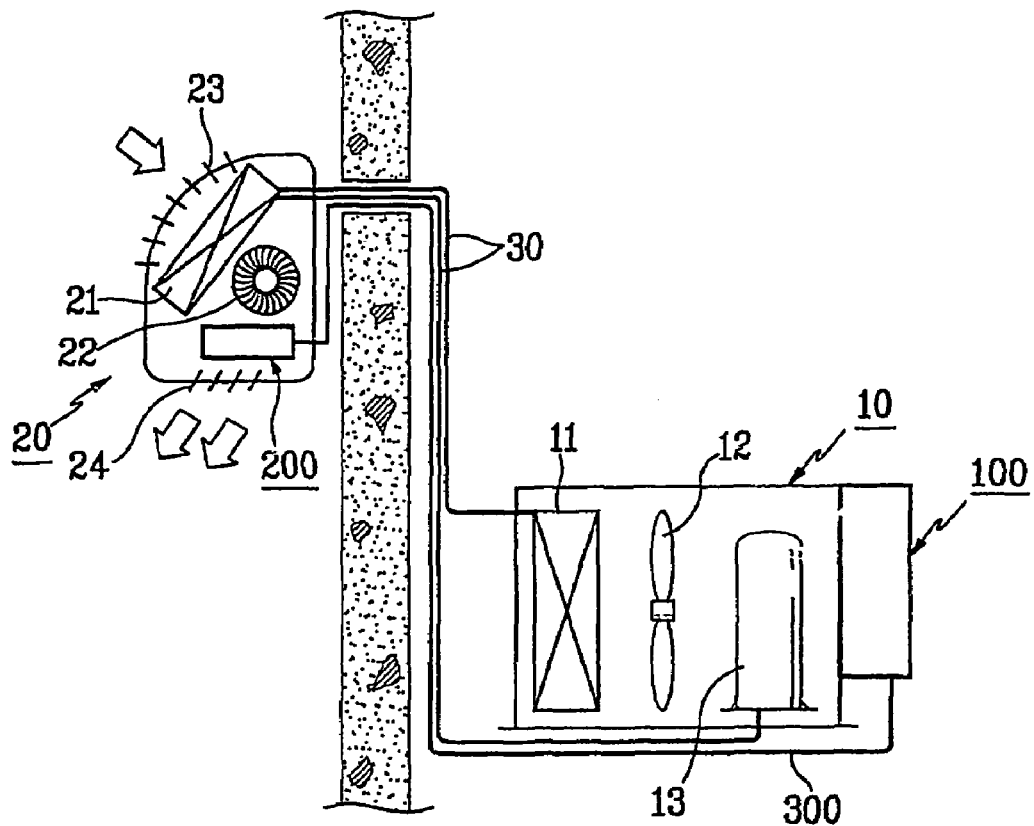
FIG. 1 illustrates a schematic diagram of a construction of an air conditioner according to the present invention.

FIG. 1 illustrates a schematic diagram of a construction of an air conditioner having an oxygen supply function according to the present invention.

Referring to FIG. 1, an air conditioner according to the present invention is a separation type, and mainly includes an outdoor module 10 compressing and condensing a refrigerant and an indoor module 20 exchanging heat with indoor air by evaporating the compressed refrigerant. And, a refrigerant tube 30 connects the outdoor module 10 to the indoor module 20 so as to transport the refrigerant. The air conditioner according to the present invention further includes an oxygen generating module so as to supply a room with a predetermined amount of oxygen.

The outdoor module 10 includes a condenser 11 condensing the refrigerant, an outdoor fan 12 blowing air to the condenser 11, and a compressor 13 compressing the refrigerant so as to supply the condenser 11 with the compressed refrigerant. And, the indoor module 20 includes an evaporator 21 expanding and evaporating the supplied refrigerant of high temperature and pressure, an indoor fan 22 supplying the air heat-exchanged by the evaporator 21, and inlet/outlet 23/24 formed at a case of the indoor module 20 so as to be next to the evaporator 21 and the indoor fan 22, respectively.

Explanation of the outdoor and indoor modules is skipped since the construction of them is the same of a general air conditioner. Instead, the oxygen generating module is explained in detail as follows.

The oxygen generating module includes an oxygen generator 100 installed at a predetermined position in the outdoor module 10, an oxygen exhauster 200 installed at the indoor module 20, and an oxygen transport tube 300 connecting the oxygen exhauster 200 to the oxygen generator 100. The oxygen generator 100 and the oxygen exhauster 200 are installed so as to be separated from each other at the outdoor and indoor modules 10 and 20, respectively, thereby inter-operating in connection with the outdoor and indoor modules 10 and 20 respectively for the smooth oxygen supply. Thus, the oxygen generating module is installed at a general air conditioner with ease, thereby enabling to prevent a noise from entering a room by locating the oxygen generator 100 outside the room. Moreover, compared to a general oxygen generator installed independently in a room, the oxygen generator of the present invention is built in one body with the air conditioner so as to save a room space.

Figure 2:
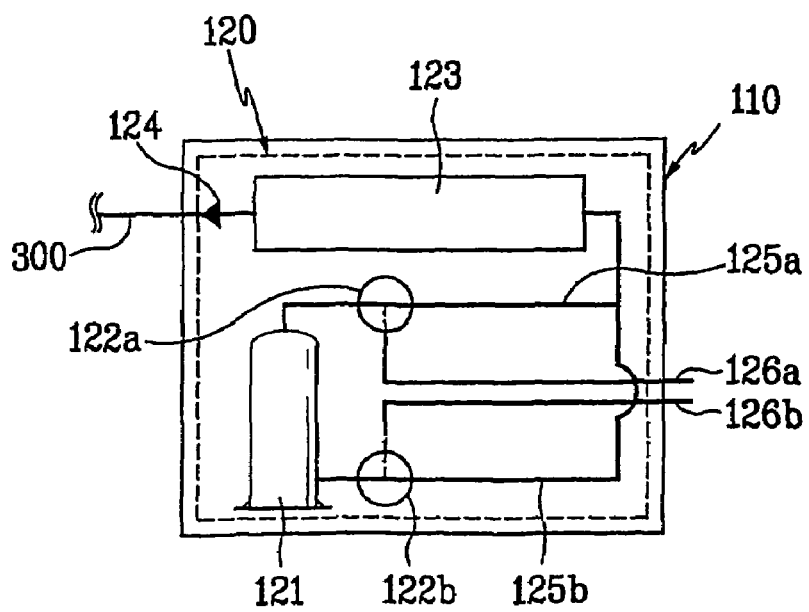
FIG. 2 illustrates a schematic diagram of an oxygen generator in an air conditioner according to the present invention.

The oxygen generator 100 in the oxygen generating module according to the present invention operates independently in the air conditioner so as to generate oxygen, of which construction is shown schematically in FIG. 2.

FIG. 2 illustrates a schematic diagram of an oxygen generator in an air conditioner according to the present invention.

Referring to FIG. 2, the oxygen generator 100 is constructed with a plurality of components, and includes a driving part 120 performing an oxygen generating function substantially and an exterior part 110 protecting the driving part.

Figure 3:
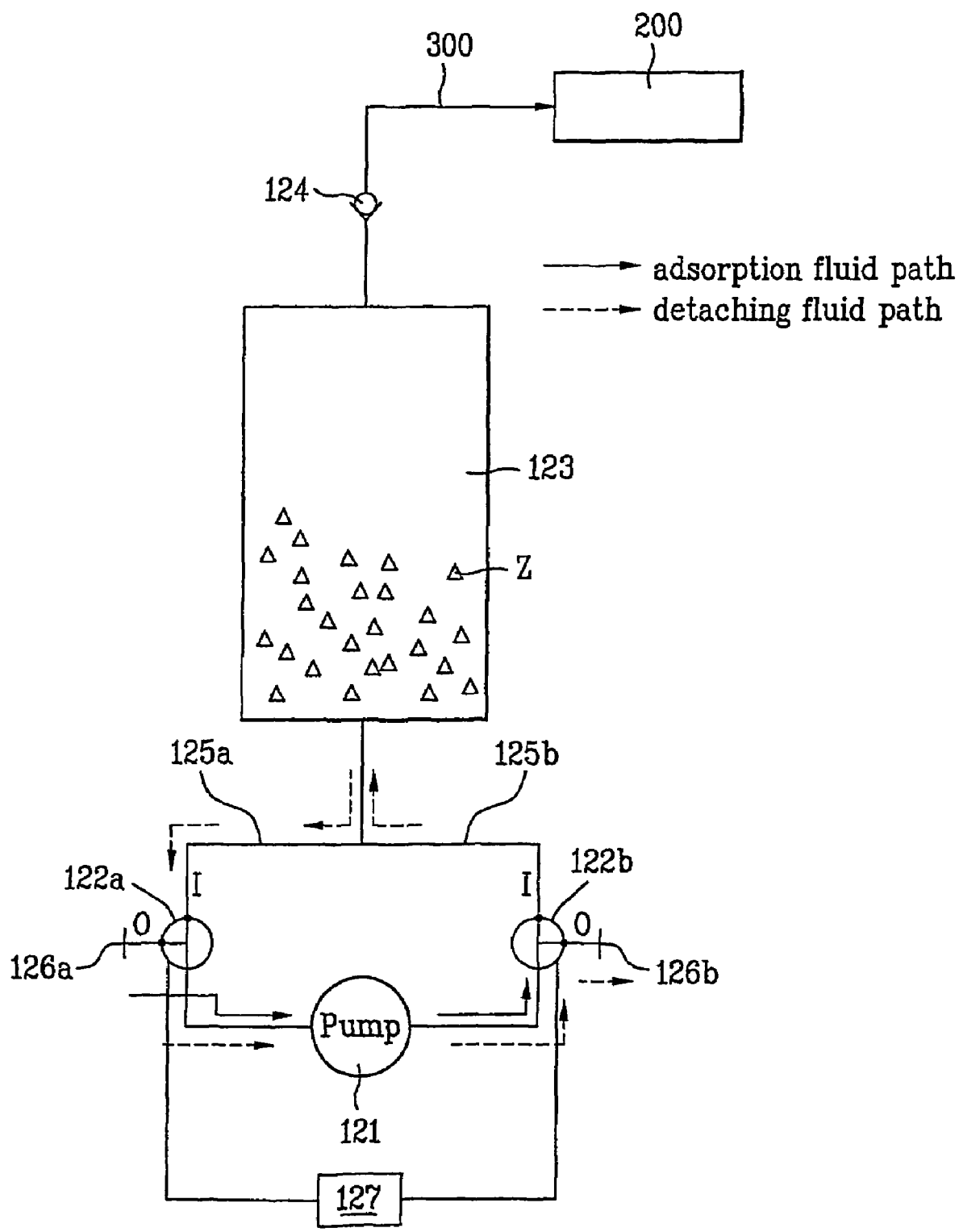
FIG. 3 illustrates a detailed diagram of a driving part of the oxygen generator in FIG. 2.

The driving part 120 separates oxygen contained in atmosphere, about 21%, so as to supply a user with the separated oxygen. Methods of generating oxygen may include electrolysis of water, chemical reactions, and the like. Lately, direct adsorption using an adsorbent is applied to the method. The present invention uses 'direct adsorption' for stability among the various methods, and a construction of the oxygen generator using an adsorbent is shown in detail in FIG. 3.

The driving part 120, as shown in the drawing, includes an air pump 121 circulating air compulsorily, first and second switch valves 122a and 122b connected to the air pump 121 in parallel so as to provide air paths selectively, an adsorption tower 123 connected to the first and second switch valves 122a and 122b and filled with an adsorbent Z adsorbing nitrogen inside from air, and a check valve 124 installed at the oxygen transport tube 300.

A first fluid path 125a is formed so as to connect the air pump 121, the first switch valve 122a, and the adsorption tower 123 reciprocally, and a second fluid path 125b is formed so as to connect the air pump 121, the second switch valve 122b, and the adsorption tower 123 reciprocally. First and second air tubes 126a and 126b introduce external air to the switch valves 122a and 122b, respectively. In this case, the first and second air tubes 126a and 126b performing the same function may preferably merge into one so as to facilitate the design and installation of the driving part 120.

Besides, the adsorbent Z charging the adsorption tower 123 is preferably Zeolite having excellent adsorption power of nitrogen.

In addition to the above-mentioned construction, the driving part 120 further includes a control part 127 operating the air pump 121 and the first and second switch valves 122a and 122b so as to provide an inner space of the adsorption tower with a compressed or vacuum state. When the oxygen generator operates 100, the control part 127 switches directions of the first and second switch valves 122a and 122b so as to form different fluid paths via the air pump 121. Namely, the first and second switch valves 122a and 122b connect the air tubes 126a and 126b connected to themselves to the pump 121 or the adsorption tower 123 to the pump 121. The control part 127 supplies the adsorption tower 123 with outdoor air for a setup time so as to make an inside of the adsorption tower 123 compressed so extract oxygen. Moreover, the control part 127 exhales the air inside the adsorption tower 123 outside so as to make the inside of the adsorption tower maintain a vacuum state. Generally, such states of compression and vacuum are repeated during the operation of the oxygen generator by the control part 127.

Yet, there exists a considerable pressure difference between the vacuum and compression states, whereby it takes a quite a lot of time to achieve a state suitable for oxygen extraction and nitrogen adsorption as well as a flow of extracted oxygen is reduced.

In order to reduce such a big difference of pressure, the control part 127 preferably repeats the compression and vacuum states periodically so as to keep the inside of the adsorption tower 123 at an atmospheric state for a predetermined time before the compression and vacuum states. In order to achieve all of the compression, vacuum, and atmospheric states, the first and second switch valves 122a and 122b connect two of the air tubes 126a and 126b, the pump 121, and the adsorption tower 123 each other selectively by the control part 127.

Figure 4A:
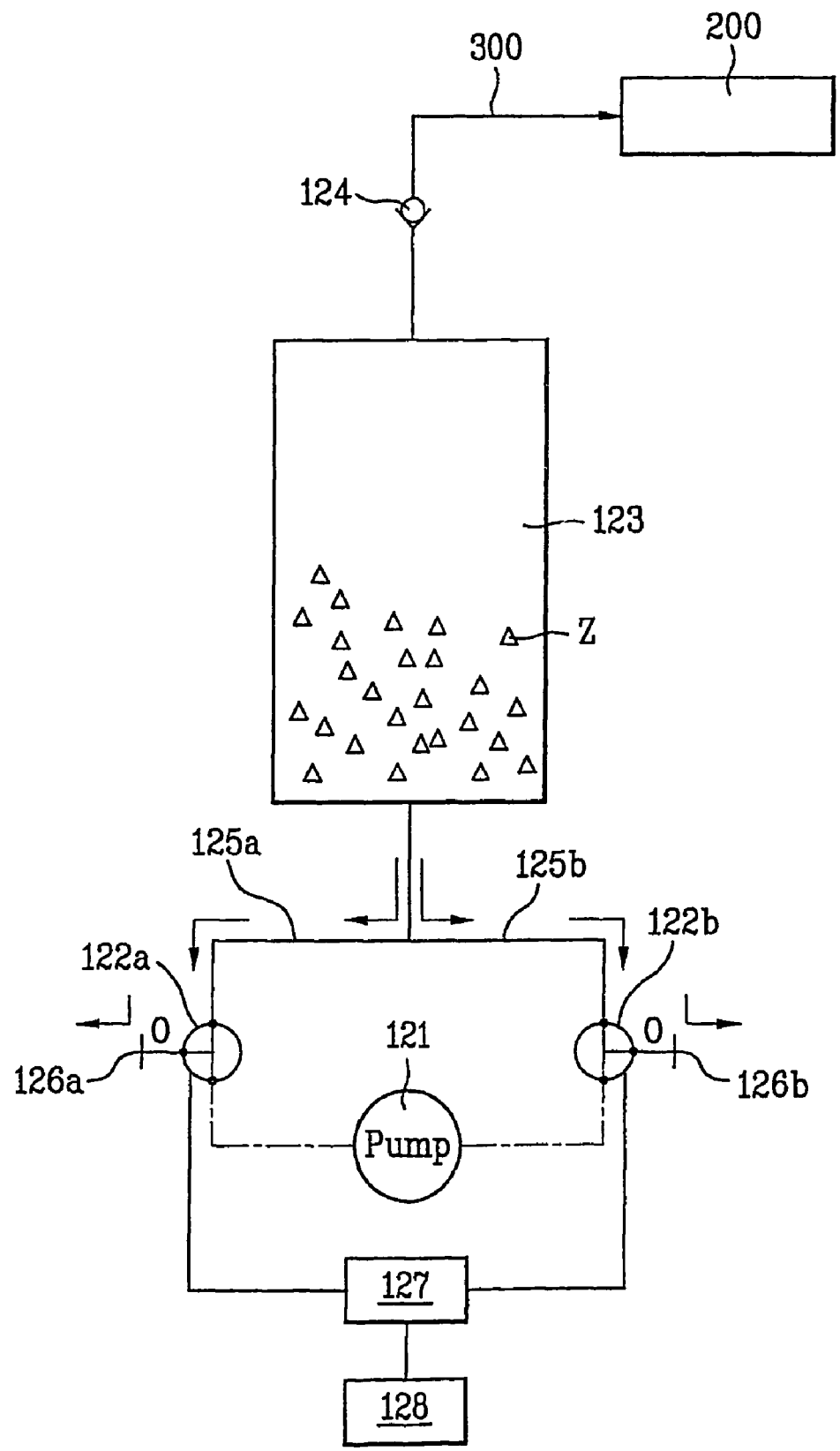
FIG. 4A to FIG. 4C illustrate schematic diagrams of another example of a driving part of an oxygen generator.
Figure 4B:
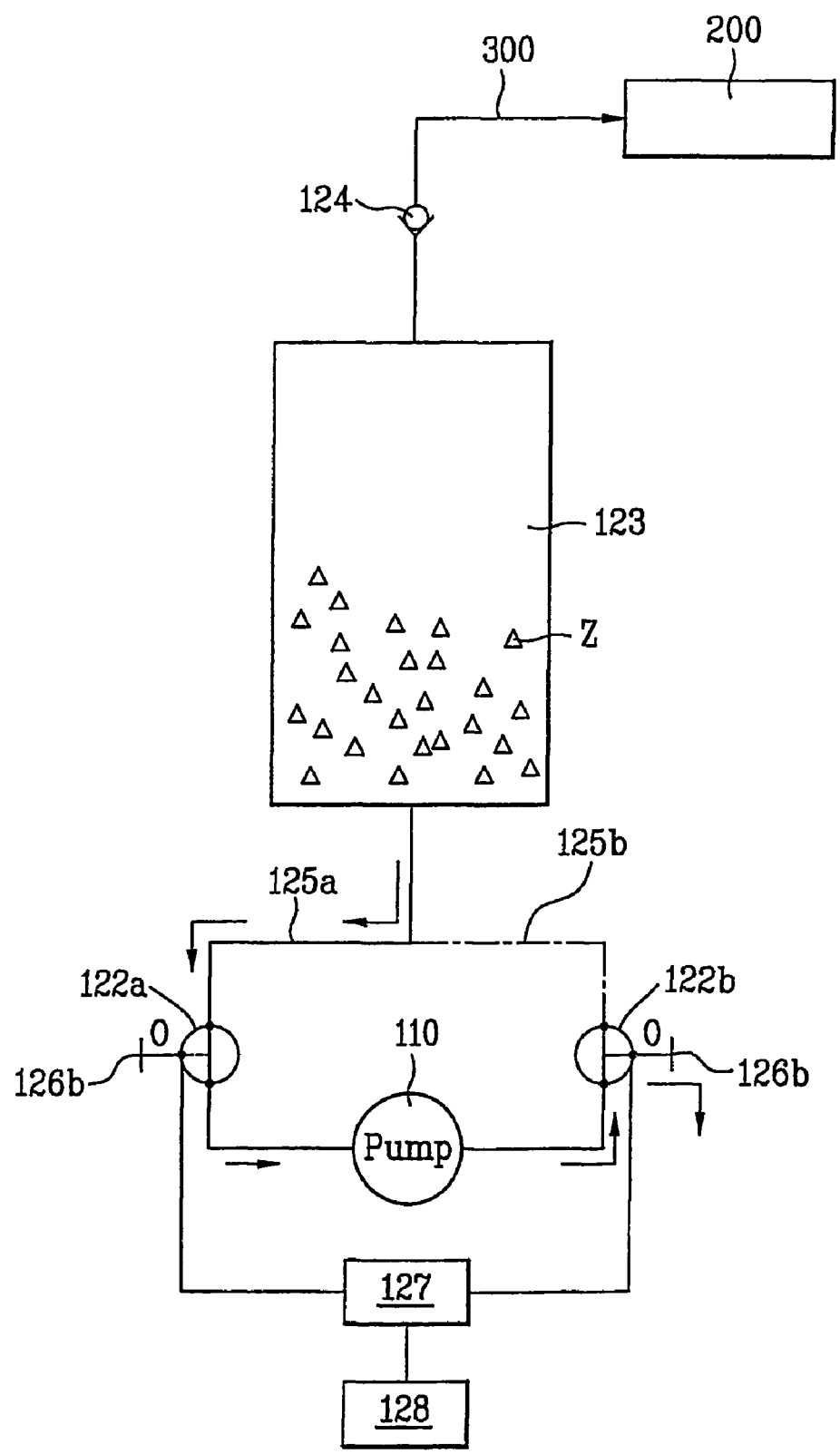

The driving part 120, as shown in FIG. 4A to FIG. 4B, preferably further includes a signal output part 128 outputting a predetermined signal to the control part 127 so as to assist a control of the relating driving part. Thanks to the signal output part 128, the control part 127 enables to carry out precisely the control of the pressure states subdivided into compression, vacuum, and atmosphere.

In detail, the signal output part 128 may be a timer measuring a time after the control operation for the pressure variation inside the adsorption tower 123, and the control part 127 determined whether to actuate the relating driving part so as to change the pressure state inside the adsorption tower by comparing an inputted measuring time value to an inside setup value. Besides, the signal output part 128 may further include a gas sensor measuring a concentration of a predetermined gas in a room, and the control part 127 compares the gas concentration value inputted to determine the actuation of the driving part to the inside setup value. In this case, the gas of which concentration is measured is preferably carbon dioxide affecting a cleanness of the indoor air. Moreover, an exposed key input part in the air conditioner may be used as the signal output part 128, and an actuating signal is outputted directly to the control part 127 by key manipulation. Therefore, a user enables to select the compression or vacuum state directly in accordance with the state of indoor air using the key input part.

The switch valves 122a and 122b are general switch valves constructed with cylinders having ports suitable for a general usage and spools forming fluid paths inside the cylinders by reciprocation, respectively. Besides, in order to improve operational stability of the valves themselves and oxygen generating performance, the present invention may use other type valves which are described in FIG. 5, FIG. 6A, and FIG. 6B.

FIG. 5 illustrates a cross-sectional view of a modified switch valve applied to a driving part of an oxygen generator, and FIG. 6A and FIG. 6B illustrate cross-sectional views of operating the modified switch valve in FIG. 5.

Switch valves of the present invention consist of first and second switch valves 400 and 500 of which main functions are the same of the previously-explained first and second valves 122a and 122b basically.

As the switch valves 400 and 500 partially differ in construction, the following description is focused on the same construction of the switch valves 400 and 500.

The first and second switch valves 400 and 500 includes vertical walls 411 and 511 extending from one ends to the other ends with predetermined lengths inside case bodies 410 and 510 forming appearances in common, respectively. First horizontal materials 421 and 521 and second horizontal materials 426 and 526 traverse both sides partitioned by the vertical walls so as to seal one ends of the case bodies 410 and 510, respectively.

Inlets 422, 427, 522, and 527 inter-connecting one ends to the other ends of the case bodies 410 and 510 are formed through the horizontal materials 421, 426, 521, and 526, respectively. Outlets 423, 428, 523, and 528 are formed near the inlets 422, 427, 522, and 527 so that the air flowing inside through the inlets 422, 427, 522, and 527 flow outside the case bodies, respectively.

At one ends sealed by the respective horizontal materials 421, 426, 521, and 526, opening/shutting means are installed so as to open and shut the outlets 423, 428, 523, and 528 of the respective horizontal materials.

In detail, the opening/shutting means include first opening/shutting materials 451 and 551 and second opening/shutting materials 456 and 556 opening and shutting the respective outlets 423, 428, 523, and 528. In the opening/shutting means, first electric magnet materials 461 and 561 and second electric magnet materials 466 and 566 are installed near the opening/shutting materials 451, 456, 551, and 556 so as to open the outlets 423, 428, 523, and 528 by moving the opening/shutting materials 451, 456, 551, and 556 by electric force, respectively. Moreover, the opening/shutting means include first elastic materials 471 and 571 and second elastic materials 476 and 576 shutting the outlets 423, 428, 523, and 528 by restoring the opening/shutting materials 451, 456, 551, and 556, respectively.

Specifically, packing materials 480 and 580 for sealing are preferably installed at tips of the first opening/shutting materials 451 and 551 and the second opening/shutting materials 456 and 556 opening and shutting the outlets 423, 428, 523, and 528 of the horizontal materials, respectively.

The horizontal materials 421, 426, 521, and 526 are made of flexible materials such as rubber and the like which enable to transform figures of the horizontal materials 421, 426, 521, and 526 once external force is applied to the horizontal materials 421, 426, 521, and 526 but restore the corresponding original figures once the external force is removed. When the horizontal materials 421, 426, 521, and 526 are formed of the flexible materials, a figure-maintaining material 490 is preferably coupled with the horizontal materials 421, 426, 521, and 526 so as to maintain the figures thereof.

Meanwhile, the distinguished constructional features are explained in the following description.

For the first switch valve 400, first and second inhale tubes 431 and 436 are installed below the horizontal materials 421 and 426 so as to be inter-connected to the inlets 422 and 427, respectively. And, the exhale tube 440 is installed so as to be inter-connected to the outlets 423 and 428. Moreover, when installed at the oxygen generator 100, the first inhale tube 431 is connected to the first air tube 126a so as to be inter-connected to an external atmosphere, while the second inhale tube 436 is connected to the adsorption tower 123. And, the exhale tube 440 is connected to an entrance of the pump 121.

For the second switch valve 500, an inhale tube 530 is formed at one side of the other end of the case body 510, and first and second exhale tubes 541 and 546 are formed at the outlets 523 and 528 of the horizontal materials, respectively. Moreover, when installed at the oxygen generator 100, the inhale tube 530 is connected to an entrance of the pump 121, the first exhale tube 541 is connected to outside through the second air tube 126b, and the second exhale tube 546 is connected to the adsorption tower 123.

In the above-constructed switch valves, when a power is not applied to the first switch valve 400, pressures, which are divided by the horizontal materials 421 and 426 and applied to one end of the case body 410 and the first inhale tube 431 are equal to each other. The horizontal materials are not transformed, and the outlets 422 and 427 shut by the opening/shutting materials 451 and 456. Therefore, air fails to leak out.

In this case, when a power is applied to the first electric magnet material 461, as shown in FIG. 6A, an electromagnetic force generated from the first magnet material 461 moves the first opening/shutting material 451 so as to open the outlet 423 of the first horizontal material. Then, the air introduced to one end of the case body 410 through the inhale tube 431 flows out through the outlet 423 of the first horizontal material, whereby pressure balance between the sealed end by the first horizontal material and the first inhale tube 431 is broken instantly. Namely, the pressure at the end sealed by the first horizontal material 421 becomes lower than that of the first inhale tube 431, the inhaling air presses a bottom of the first horizontal material 421. Such an instant pressure difference transforms toward one end of the case body 410, thereby bring about a gap between the bottom of the first horizontal material 421 and the exhale tube 440. Therefore, the air is exhaled through the occurring gap through the exhale tube 440.

After the power is shut down to the first electric material 461, the first opening/shutting material 451 is restored by the first elastic material 471 so as to balances the pressures at the first inhale tube 431 and the one end sealed by the first horizontal material 421. Thus, the first horizontal material returns to its initial state, and the gap between the exhale tube 440 and the bottom of the first horizontal material 421 disappears.

When the power to the first electric magnet material 461 is shut down as soon as another power is applied to the second electric magnet material 466, the air inhaled through the second inhale tube 436 is exhaled to the exhale tube 440 through a gap generated from the same operation of the above-explained principle.

Consequently, air is selectively inhaled through the first inhale tube 431 or the second inhale tube 436 so that the first switch valve 400 enables to exhale the inhaled air by applying a power to the first or second electric magnet material 461 or 466.

Meanwhile, the second switch valve 500 operates in a manner similar to that of the first switch valve 400, but further includes one inhale tube 530 and a pair of exhale tubes 541 and 546. By applying a power to the first and second electric magnet materials 561 and 566 selectively, the second switch valve 500 exhales air inhaled through the inhale tube 530 to the first or second exhale tube 541 or 546 selectively.

The valves according to the present invention and a general switch valve differ in constructions. In the general switch valve, a packing is attached to a spool so as to prevent air leakage. The packing is pressed by an entering air pressure so as to seal a gap between the spool and cylinder. When the entering air pressure is low, a pressure loss occurs due to the insufficient sealing between the gap so as to reduce the inner pressure of the adsorption tower 123 and the generating amount of oxygen.

Yet, as explained in the foregoing description, the switch valves 400 and 500 according to the present invention secure the sealing structurally, thereby minimizing the pressure loss during the switching operation. Therefore, the present invention prevents the pressure decrease inside the adsorption tower 123 as well as attains a constant oxygen generating flow. Besides, the respective horizontal materials 421, 426, 521, and 526 are made of flexible materials sensitive to a pressure variation, thereby being applicable to a low pressure range.

Figure 7:
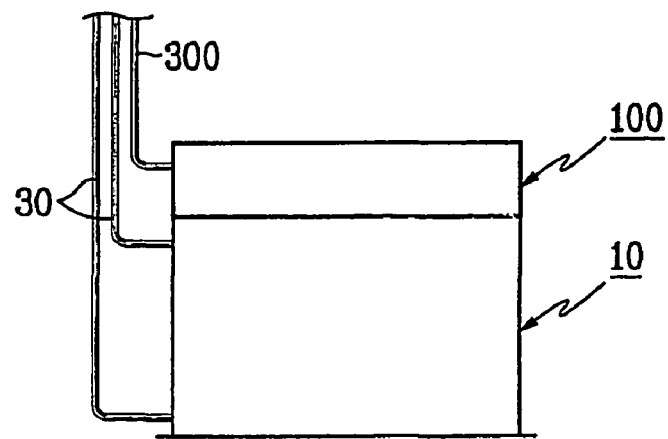
FIG. 7 illustrates a schematic diagram of an exemplary position of an oxygen generator in an air conditioner according to the present invention.

In aspect of a installing position of the oxygen generator 100, compared to any other positions, a top of the outdoor module 10 is an optimal place on which the oxygen generator 100 is placed with ease and stability. Thus, the oxygen generator 100 may be installed at a random place of the outdoor module 10 except the inhale part, but, as shown in FIG. 7, is preferably placed on the outdoor module 10. Therefore, the oxygen generator 100 is installed so as to be separated from the outdoor module 10, or is installed in one body with the outdoor module 10.

Figure 8:
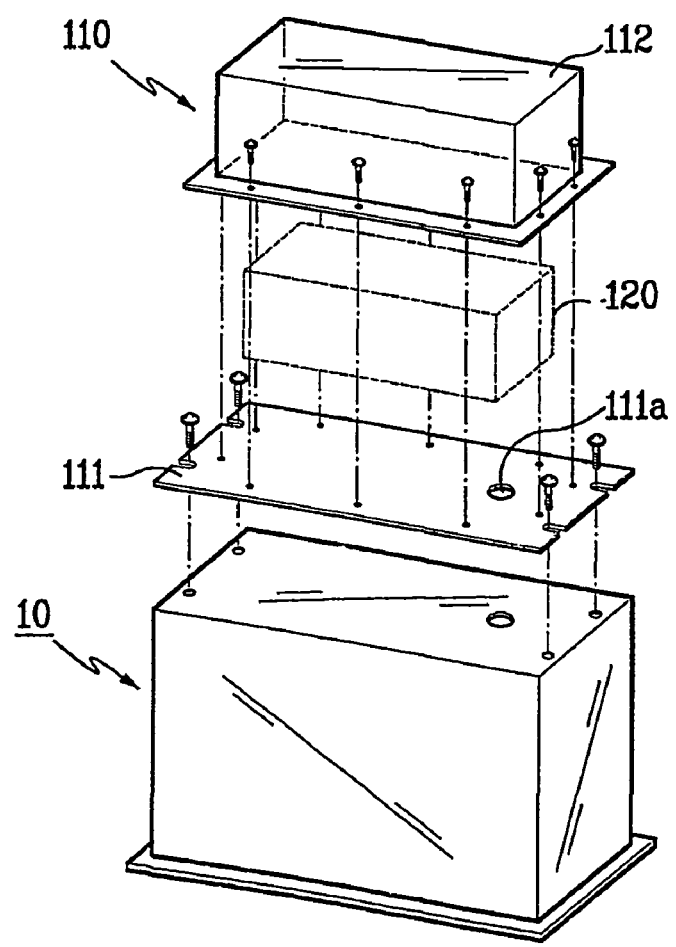
FIG. 8 illustrates a bird's-eye view of an embodiment of a disassembled installation structure of the oxygen generator in FIG. 7.

When the oxygen generator 100 is installed so as to be separated from the outdoor module 10, the exterior part 110 of the oxygen generator 100 includes additional components. In detail, the exterior part 110, as shown in FIG. 8, is constructed with a support plate 111 fixed to the top of the outdoor module 10 and a housing 112 fixed to the support plate 111, in which the support plate 111 and housing 112 are fixed by fixing means. In this case, the driving part 120 is fixed to the support plate 111, whereby the support plate 111 supports the driving part 120 stably with the top of the outdoor module 10. The housing 112 covers to protect the driving part 120 on the support plate 111.

Figure 9:
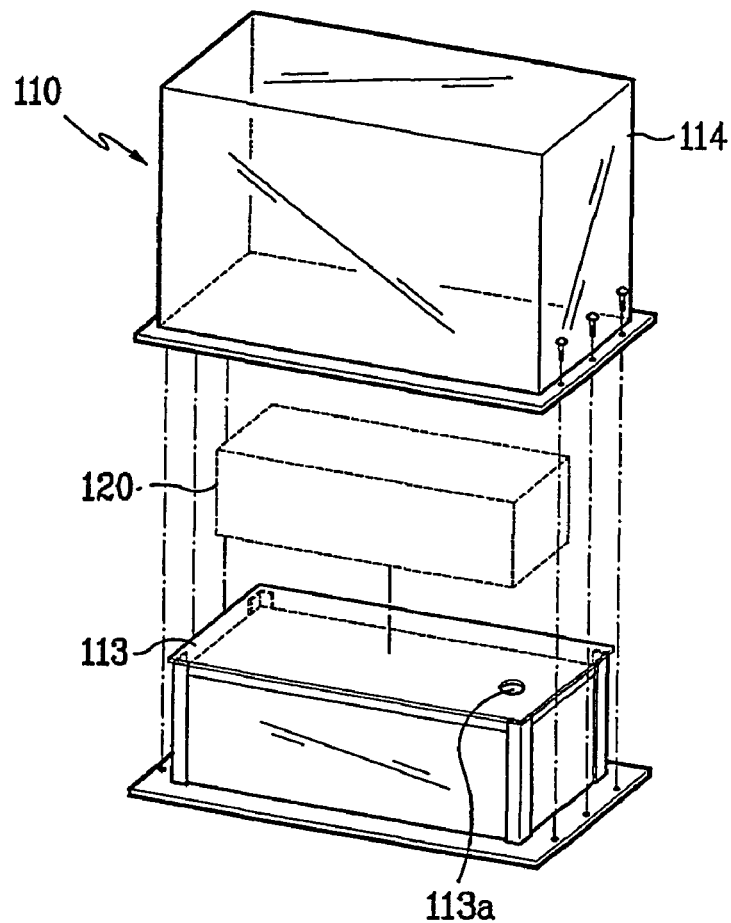
FIG. 9 illustrates a bird's-eye view of another embodiment of a disassembled installation structure of the oxygen generator in FIG. 7.

When the oxygen generator 100 is installed in one body with the outdoor module 10, the exterior part 110 shares components in part with the outdoor module 10. Namely, the exterior part 110, as shown in FIG. 9, shares the housing 114 with the outdoor module 10. Therefore, the exterior part 110 includes an upper part of the outdoor module 10, i.e., a separating plate 113 installed at a top of an outdoor module driving part support structure, and a housing protecting the driving part 120 and the outdoor module driving part. In this case, the separating plate 113 divides an inner region so as to secure an installation area of the driving part 120, and supports the fixed driving part 120.

Meanwhile, the outdoor module 10 and the oxygen generator 100 are formed inter-connectively so that the first and second air tubes 126a and 126b of the driving part 120 in the oxygen generator 100 are preferably located near the compressor 13 in the outdoor module 10. When the compressor 13 is actuated substantially, a surrounding temperature increases high and the hot air around the compressor is inhaled through the first and second air tubes 126a and 126b, thereby increasing an efficiency of the oxygen generator 100.

When the oxygen generator 100 are installed separately, as shown in FIG. 8, the support plate 111 of the exterior part 110 further includes a penetrating hole 111a of a predetermined size through which the first and second air tubes 126a and 126b pass, and another penetrating hole corresponding to the penetrating hole 113a is formed at the outdoor module 10 as well.

When the oxygen generator 10 is installed in one body with the outdoor module 10, as shown in FIG. 7, another penetrating hole 113a of a predetermined size is formed at the separating plate 113 through which the first and second air tubes 126a and 126b pass.

Figure 10:
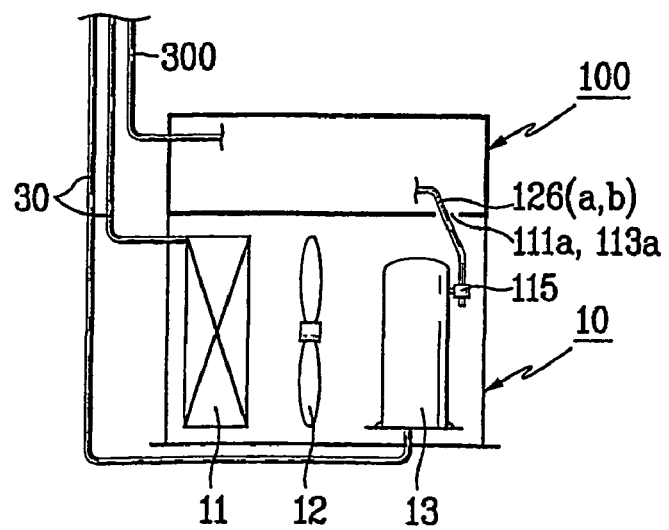
FIG. 10 illustrates a schematic diagram of an oxygen generator according to the embodiments in FIG. 8 and FIG. 9.

Due to the respective inter-connecting structures, the first and second air tubes 126a and 126b, as shown in FIG. 10, are arranged near the compressor 13. In order to arrange the air tubes 126a and 126b near the compressor 13 with ease, the penetrating holes 111a and 113a are preferably formed adjacent to the top of the compressor. More preferably, in order to arrange the air tubes 126a and 126b more stably, the fixing material fixing the air tubes 126a and 126b may be attached to a surface of the compressor 13 or near the compressor 13.

Figure 11:
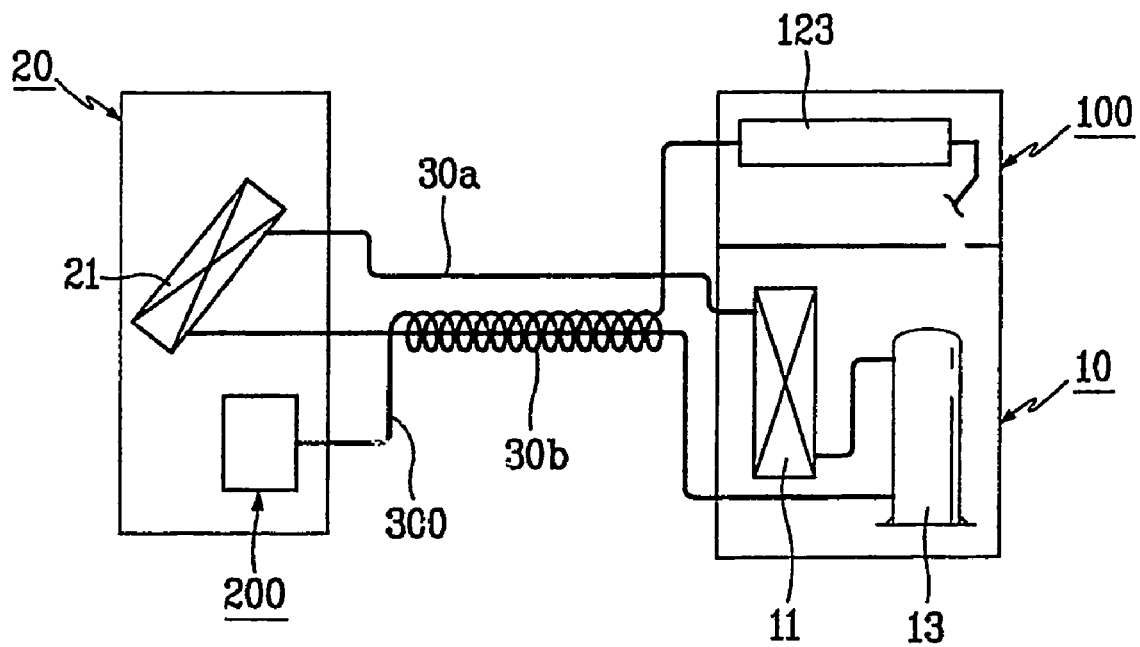
FIG. 11 illustrates a schematic diagram of an arrangement of an oxygen transport tube in an air conditioner according to the present invention.

The oxygen transport tube 300 in the oxygen generating module according to the present invention transports oxygen generated from the oxygen generator 100 to the oxygen exhauster 200. In this case, the oxygen transport tube 300, as shown in FIG. 11, is preferably arranged adjacent to the refrigerant tube 39b through which the refrigerant at a low pressure and a low temperature flows instead of the other refrigerant tube 39a through which the refrigerant at a high pressure and a high temperature flows. This is because such an arrangement lowers the temperature of the transported oxygen to supply fresh and pleasant oxygen. More preferably, in order to reduce the temperature of oxygen effectively, the oxygen transport tube 300 is arranged so as to be wound round the refrigerant tube 30b.

Figure 12:
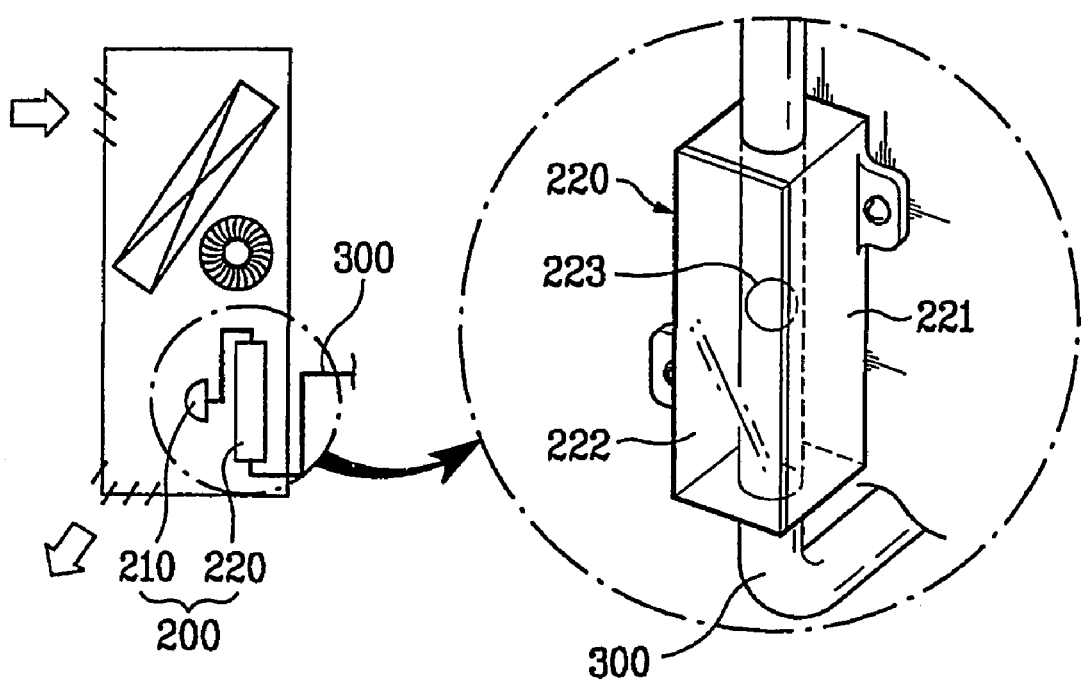
FIG. 12 illustrates a schematic diagram and a bird's-eye view of an oxygen exhauster in an air conditioner according to the present invention.

The oxygen exhauster 200 in the oxygen generating module, as shown in FIG. 12, includes an oxygen exhaust part 210 connected to the oxygen transport tube 300 so as to discharge oxygen in a room. The oxygen exhaust part 210 is preferably arranged in front of the evaporator 21 sucking air to be cooled or at the rear of the evaporator blowing the cooled air. In any circumstances, the air coming out of the oxygen exhaust part 210 is cooled down so as to supply fresh air.

Preferably, the oxygen exhauster 200 may further include an oxygen generating display part 220 connected to the oxygen transport tube 300 so as to display an oxygen supply flow. In this case, the oxygen generating display part 220 is constructed with a body 221 of which both ends are connected to the oxygen transport tube 300 and the oxygen exhaust part 210 respectively and having a fluid path interconnected to both ends inside, a transparent window 222 attached to a front of the body 12m and a float 223 inserted into the fluid path of the body 10. Thus, the float 223 floats when oxygen is supplied through the oxygen transport tube 300, and a floating height of the float 223 fluctuates in accordance with the oxygen supply. Hence, a user of the air conditioner according to the present invention enables to check the fluctuation of the float 223 through the transparent window 222. Therefore, the oxygen generating display part 220 provides a user with a visual effect for the oxygen generation as well as measures the amount of the generated oxygen precisely.

As mentioned in the above explanation, the air conditioner according to the present invention has a construction enabling to supply a room with oxygen. And, operation of the above-constructed present invention is explained in the following description by referring to the relating drawings.

Operation of the present invention mainly includes an air conditioning process of maintaining constant temperature and humidity of air in a room and an oxygen supply process of supplying the room with a constant amount of oxygen. The air conditioning process is carried out using the outdoor and indoor modules 10 and 20, while the oxygen supply process does using the oxygen generator 100 and the oxygen exhauster 200, and the like.

In the air conditioning process, as shown in FIG. 1, the compressor 13 compresses the low temperature/pressure refrigerant transported through the refrigerant tube 30 from the evaporator 21. The compressed refrigerant experiences a phase transition into a liquid-phased refrigerant of high temperature/pressure in the condenser 11, and then is transported to the evaporator 21 through the refrigerant tube 30. The refrigerant expanding and evaporating in the evaporator 21 exchanges heat with air passing through the inlet 23, whereby the air is cooled. The room is then supplied with the cooled air through the outlet 24.

The air conditioning process of the present invention is a general fact, of which detailed explanation is skipped. Instead, the oxygen supply process is explained in detail by referring to FIG. 1 to FIG. 3 as follows.

The oxygen supply process may include an oxygen generating process carried out by the oxygen generator 100, an oxygen transport process transporting the generated oxygen to the oxygen exhauster 200 through the oxygen transport tube 300, and an oxygen discharging process carried out by the oxygen exhauster 200.

In the oxygen supply process, the oxygen generating process generally includes a pressurizing step of pressurizing an inside of the adsorption tower 123 so as to adsorb nitrogen from external air and separate to generate oxygen and a vacuum (decompressing) step of forming a vacuum so as to detach to exhaust the nitrogen adsorbed to an adsorbent.

In the pressurizing step, the external air is introduced through the first switch valve 122a and the first air tube 126a so as to be compressed. The compressed air is then supplied inside the adsorption tower 123 through the second switch valve 122b and the second fluid path 125b so as to pressurize the adsorption tower 123.

During such a pressurization, the nitrogen contained in the external air is adsorbed by the adsorbent Z in the adsorption tower 123 so as to separate oxygen therefrom. And, the oxygen over a predetermined pressure is discharged to the oxygen transport tube 300 by the check valve 124.

In the vacuum (decompressing) step, the first and second switch valves 122a and 122b switches a fluid path opposite to that in the pressurizing step. Namely, the first switch valve 122a and the second switch valve 122b are connected to the first fluid path 12a and the second air tube 126b, respectively. In this case, the air pump 121 transports the air from the first switch valve 122a to the second switch valve 122b like the pressurizing step, whereby a vacuum state is formed inside the adsorption tower 123 by a suction force of the air pump 121. And, the check valve 124 maintains a sealed state against reverse-directional air fluidity. During the vacuum step, nitrogen gas is detached from the adsorbent Z so as to be exhausted externally through the first fluid path 125a, first switch valve 122a, air pump 121, second switch valve 122b, and second sir tube 126b in order. Therefore, the adsorbent in the adsorption tower 123 returns to a status enabling to generate oxygen by the pressurizing step.

Such a general oxygen generating process generates oxygen continuously by carrying out the pressurizing and decompressing steps repeatedly.

Figure 13:
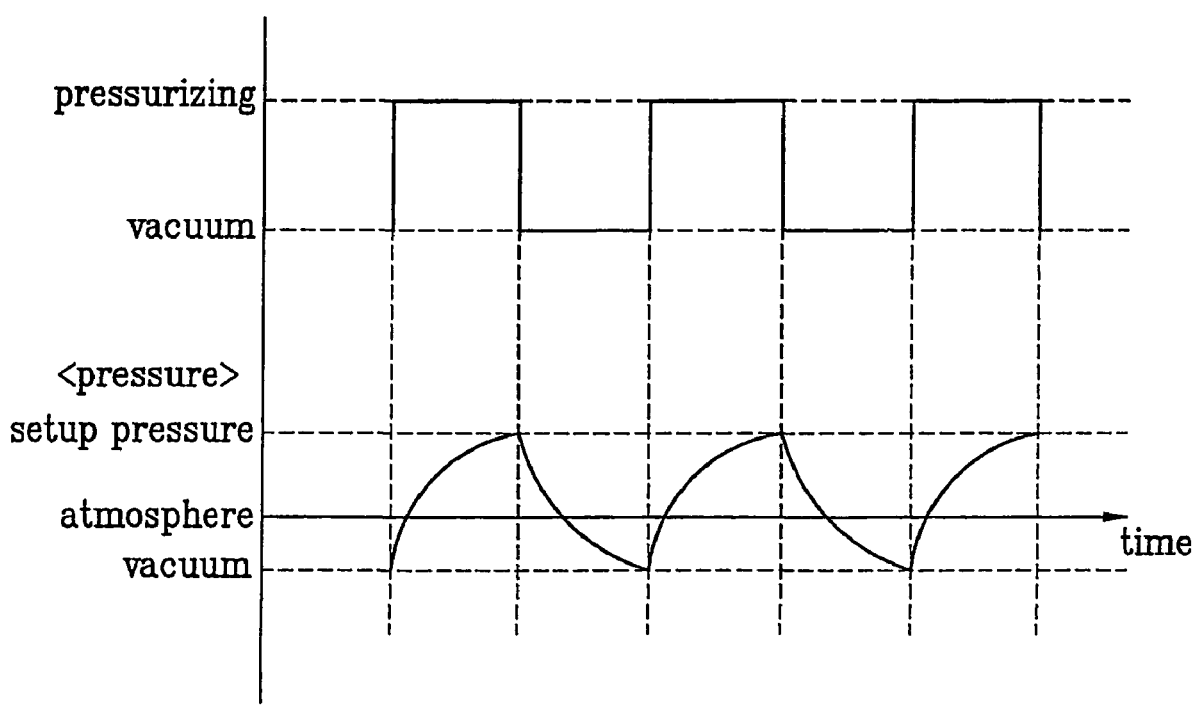
FIG. 13 illustrates a graph of a pressure variation inside an adsorption tower in accordance with periods of compression and vacuum stages in a general process of generating oxygen.

FIG. 13 illustrates a graph of a pressure variation inside an adsorption tower in accordance with periods of compression and vacuum stages in a general process of generating oxygen.

Referring to FIG. 13, a considerable time is taken to pressurize the adsorption tower 123 from a vacuum state to a setup pressure in the pressurizing step or decompress the adsorption tower 123 from the setup pressure to a setup vacuum state. Thus, a time taken to maintain a setup pressure for a constant pressurizing/decompressing time is relatively reduced so that there is a limit to an output flow of oxygen proportional to a pressure inside the adsorption tower 123. Moreover, as the pressurizing step is shifted abruptly to the decompressing step and vice versa, the instant pressure variation gives a severe impact on the air pump 121. Such an impact deteriorates stability of the oxygen generator.

Yet, such problems can be overcome by establishing a step of compensating a pressure inside the adsorption tower 123 before the transition to the pressurizing or decompressing step.

Figure 14A:
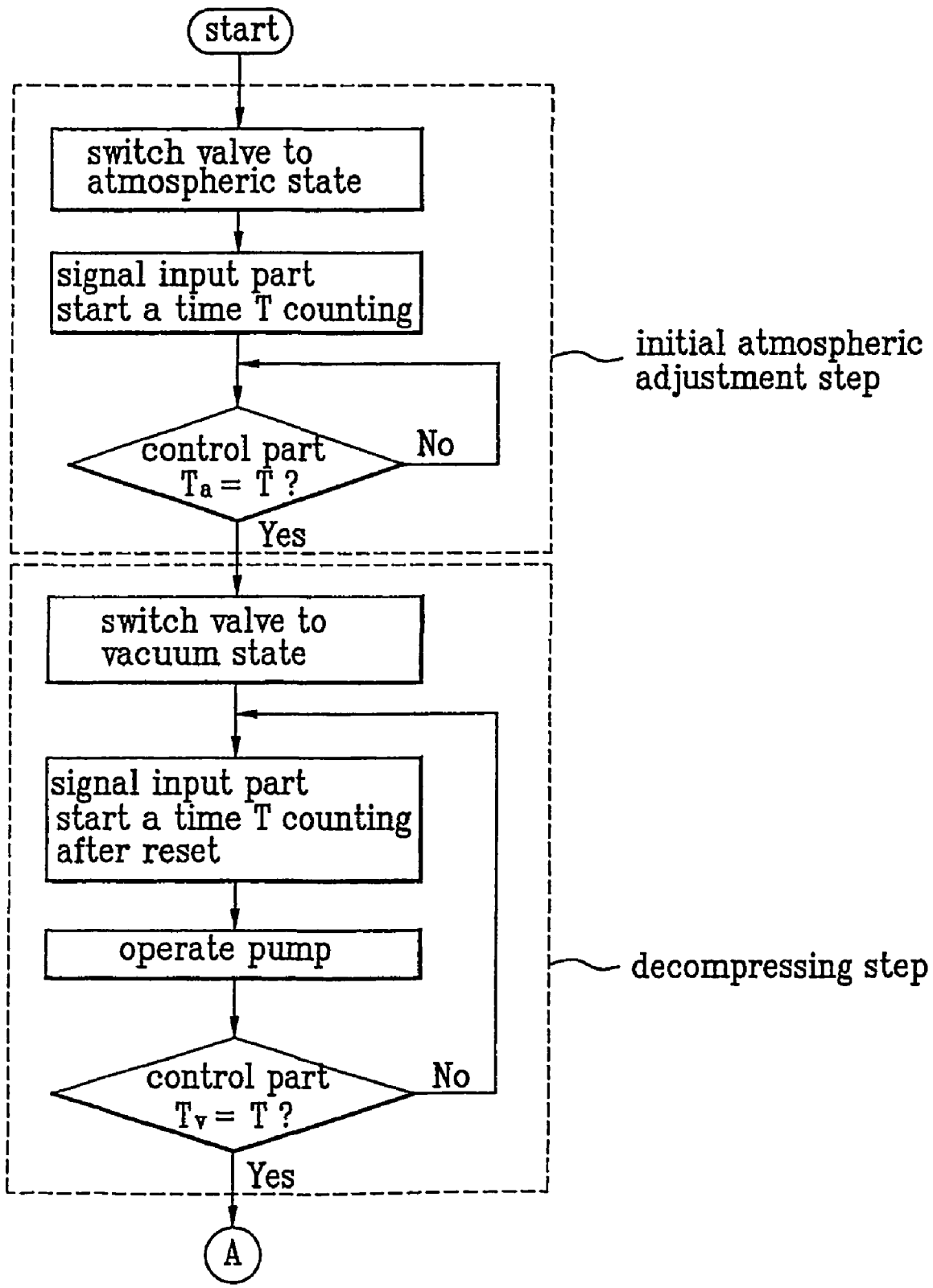
FIG. 14 illustrates a flowchart of generating oxygen in an air conditioner according to a first embodiment of the present invention.
Figure 14B:
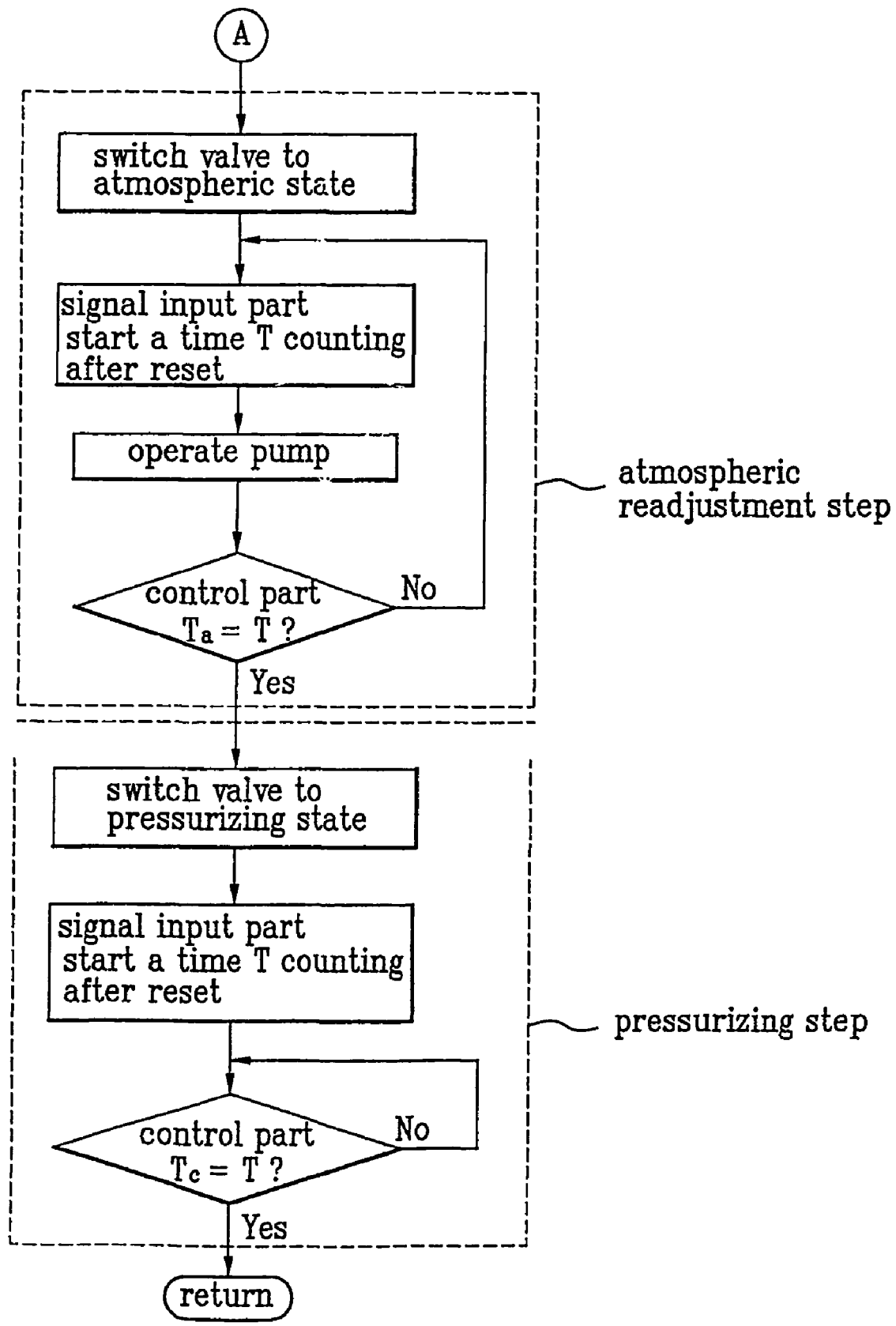

FIG. 14 illustrates a flowchart of generating oxygen in an air conditioner according to a first embodiment of the present invention. In the first embodiment, each step is controlled by a time. And, the signal output part 128 operating in connection with the control part 127 is applied to the first embodiment of the present invention.

Referring to FIG. 14, when the oxygen generator 200 operates, the adsorption tower 123 is connected to an external atmosphere so that an inner part of the adsorption tower 123 is adjusted to an atmospheric pressure.

In the initial adjustment step, as shown in FIG. 4A, the first switch valve 122a at an inhale side and the second switch valve 122b at an exhale side are switched so that the inner part of the adsorption tower 123 is inter-connected to an outside. Namely, by the control of the control part 127, the first switch valve 122a connects the adsorption tower 123 to the first air tube 126a as soon as the second switch valve 122b connects the adsorption tower 123 to the second air tube 126b. In this case, when the switch valves 400 and 5000 shown in FIG. 6 are applied, all of the opening/shutting materials 451, 456, 551, and 556 are simultaneously opened/shut so that the adsorption tower 123 is inter-connected to the external atmosphere through the opened outlets 423, 428, 523, and 528.

A time T is then measured after the switch by the signal output part 128 so as to be outputted to the control part 127. The time measured by the signal output part 128 is compared to an atmospheric maintaining time Ta, which is set up inside, by the control part 127. If the measured time T is different from the setup time Ta, the switched statuses of the switch valves 122a and 122b are maintained so as to keep the atmospheric state inside the adsorption tower 123. Namely, the atmospheric state is kept for the atmospheric maintaining time Ta set up at the control part 127.

If the time measured by the signal output part 128 becomes equal to the atmospheric maintaining time Ta, the initial adjustment step to the atmospheric pressure is ended, and the inner part of the adsorption tower 123 is decompressed down to a setup vacuum state so as to detach nitrogen from the adsorbent Z.

In such a decompressing step, as shown in FIG. 4B, the first and second switch valves 122a and 122b are switched by the control part 127 so as to form a fluid path from the adsorption tower 123 to an external air, i.e., to the air tube 126b through the pump 121. In detail, by the control of the control part 127, the first switch valve 122a connects the adsorption tower 123 and pump 121 each other as soon as the second switch valve 122b connects the pump 121 and second air tube 126b.

A time T after the switch is measured by the signal output part 128 so as to be outputted to the control part 127, and, simultaneously, the pump 121 starts to operate. In this case, the air inside the adsorption tower is sucked by a sucking force of the pump 121 so as to be discharged externally. And, the inner part of the adsorption tower 123 is decompressed to a vacuum state. In this case, nitrogen adsorbed by the adsorbent Z is separated from the adsorbent Z by the vacuum ambience so as to be discharged externally through the first switch valve 122a, pump 121, and second switch valve 122b in order.

In such a step of operating the pump 121 for decompression, when the switch valves 400 and 500 in FIG. 5 are applied to the oxygen generator 100, as shown in FIG. 6B, the second opening/shutting material 456 of the first switch valve and the first opening/shutting material 551 of the second switch valve are moved by the second electric magnet material 466 of the first switch valve and the first electric magnet material 561 of the second switch valve. The outlet 428 of the second horizontal material and the outlet 523 of the first horizontal material are opened by the movement of the horizontal materials, while the outlet 423 of the first horizontal material and the outlet 528 of the second horizontal material are shut. Therefore, the second inhale tube 436 is connected to the adsorption tower 123 and the first exhale tube 541 is connected to the second air tube 126b. Accordingly, the air inside the adsorption tower 123 is discharged externally through the first switch valve 400, air pump 121, and the second switch valve 500.

Figure 15A:
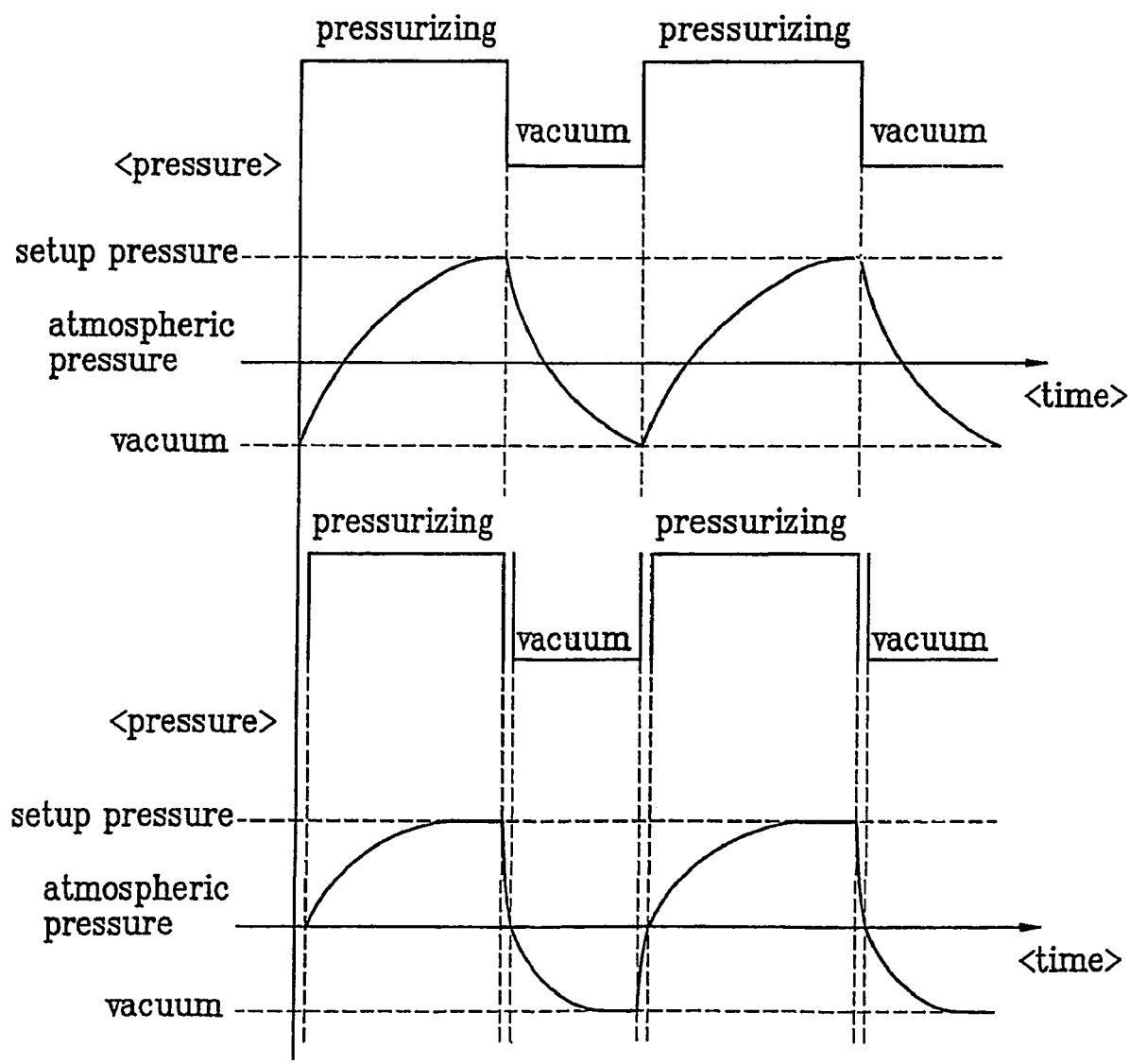
FIG. 15A and FIG. 15B illustrate graphs of pressure variations inside an adsorption tower in accordance with periods of compression and vacuum stages in a process of generating oxygen according to a first embodiment of the present invention.

As the decompressing step starts from the atmospheric state, a pressure amount to be decompressed to a setup vacuum is reduced therefrom. Compared to the related art, as shown in FIG. 15A, the time taken to reach the setup vacuum state of the adsorption tower 123 is greatly reduced.

Meanwhile, while the pump 121 keeps operating, the time T measured by the signal output part 128 is compared by the control part 127 to a vacuum maintaining time Tv set up in the control part 127. In this case, if the time T measured by the signal output part 128 is different from the vacuum maintaining time Tv set up in the control part 127, the pump 121 maintains to operate.

If the time T measured by the signal output part 128 becomes equal to the vacuum maintaining time, the decompressing step is substantially ended. And, the adsorption tower 123 is inter-connected to the external atmosphere so that the inner part of the adsorption tower 123 is adjusted to the atmospheric state.

The atmospheric readjustment step is carried out precisely for the atmospheric maintaining time Ta set up in the control part 127 after the pump 121 stops operating by the signal output part 128 and control part 127. Such an atmospheric readjustment step is the same of the initial atmospheric adjustment step explained previously, of which explanation is skipped.

After the completion of the atmospheric readjustment step, the inner part of the adsorption tower is pressurized up to a setup pressure so as to extract oxygen from air using the adsorbent Z.

Figure 4C:
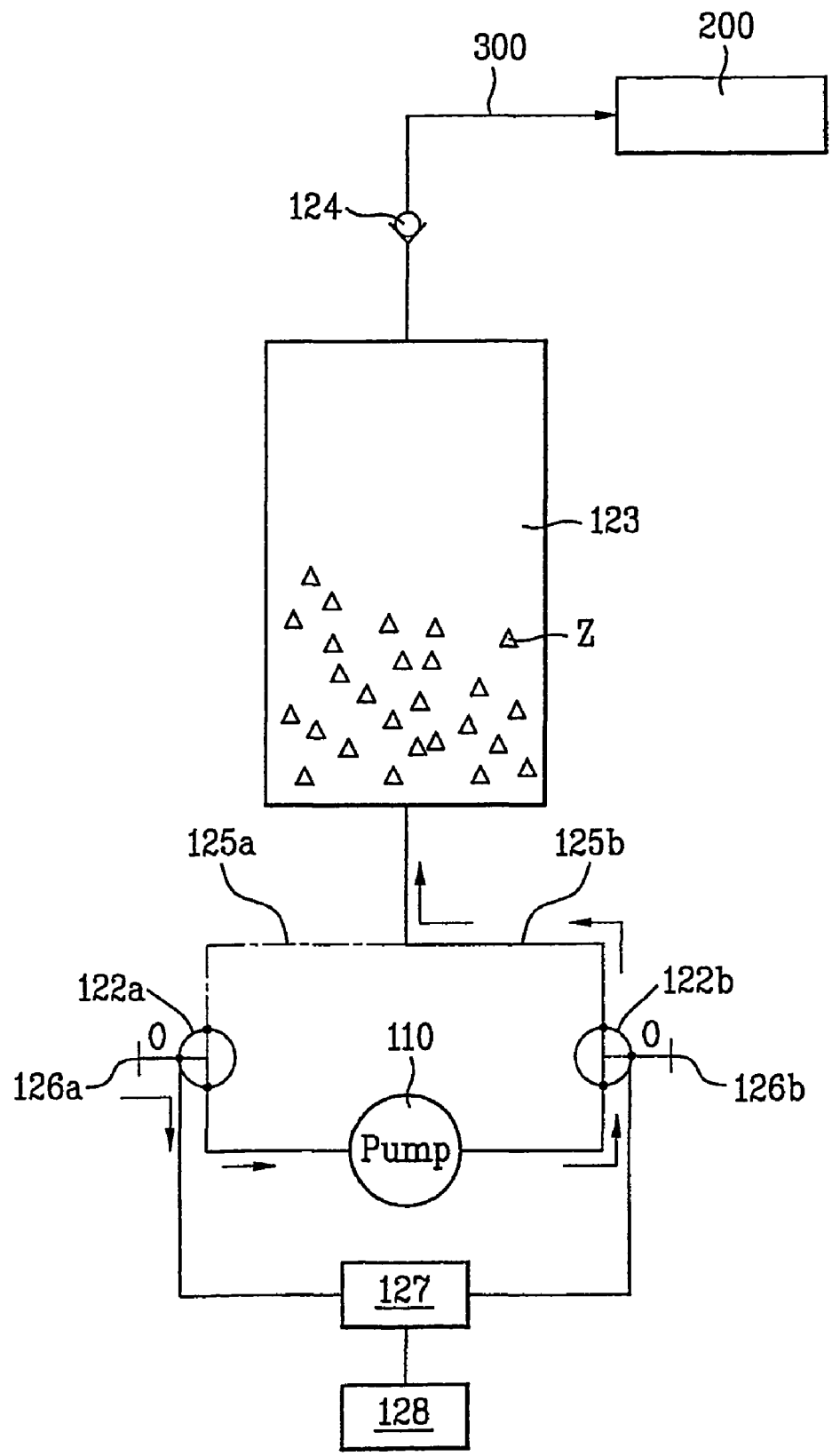

In the pressurizing step, as shown in FIG. 4C, the switch valves 122a and 122b are switched by the control part 127 so as to form a fluid path from the air tube 126a to the adsorption tower 123 through the pump 121. Namely, the first switch valve 122a connects the first tube 126 to the pump 121, and the second switch valve 122b connects the pump 121 to the adsorption tower 123.

Thereafter, a time T after the switch step is measured by the signal output part 128 so as to be outputted to the control part 127 as soon as the control part 127 starts to operate the pump 121. In this case, the external air is compressed by the pump 121 through the first switch valve 122a, and then enters the inner part of the adsorption tower 123 through the second switch valve 122b. Therefore, the inner part of the adsorption tower 123 is pressurized so that nitrogen contained in the external air is adsorbed by the adsorbent Z. Thus, oxygen is generated by separation. The generated oxygen over a predetermined amount is discharged through the check valve 124.

In this case, when the switch valves 400 and 500 in FIG. 5 are applied to the oxygen generator 100, as shown in FIG. 6A, the first and second opening/shutting materials 451 and 556 are moved by the first and second electric magnet materials 461 and 566 so as to open the outlet 423 of the first horizontal material and the outlet 528 of the second horizontal material, respectively. Thus, the first inhale tube 431 is connected to the first air tube 126a, and the second exhale tube 546 is connected to the adsorption tower 123. Therefore, the external air is introduced into the adsorption tower 123 through the first switch valve 400, air pump 121, and second switch valve 500 so as to generate oxygen.

The above pressurizing step starts from the atmospheric state like the foregoing decompressing step, in which the pressure size to be pressurized up to the setup pressure is substantially reduced. And, as shown in FIG. 15A, the adsorption tower 123 reaches the setup pressure state fast.

While the pump 121 operates, the time T measured by the signal output part 128 is continuously compared by the control part 127 to a pressurizing state maintaining time Tc, which is set up in the control part 127. If the time T measure by the signal output part 128 is different from the pressurizing state maintaining time Tc, the pumps keeps operating so as to maintain the pressurizing state. Thereafter, if the measured time T becomes equal to the pressurizing state maintaining time Tc, the pressurizing step is substantially ended. And, the adsorption tower 123 is inter-connected to the external atmosphere again so that the inner part of the adsorption tower 123 is readjusted to the atmospheric state.

In the oxygen generating method according to the first embodiment afterwards, while the oxygen generator operates, the decompressing, atmospheric readjustment, and pressurizing steps are repeated in order after the initial adjustment step. Moreover, as mentioned in the foregoing description, the decompressing step is carried out firstly after the initial atmospheric adjustment step. Instead, it is also able to carry out the decompressing and pressurizing steps in reverse order as well. Namely, the pressurizing step is carried out after the initial atmospheric adjustment step, and the decompressing step may be carried out after the initial atmospheric adjustment step.

Figure 15B:
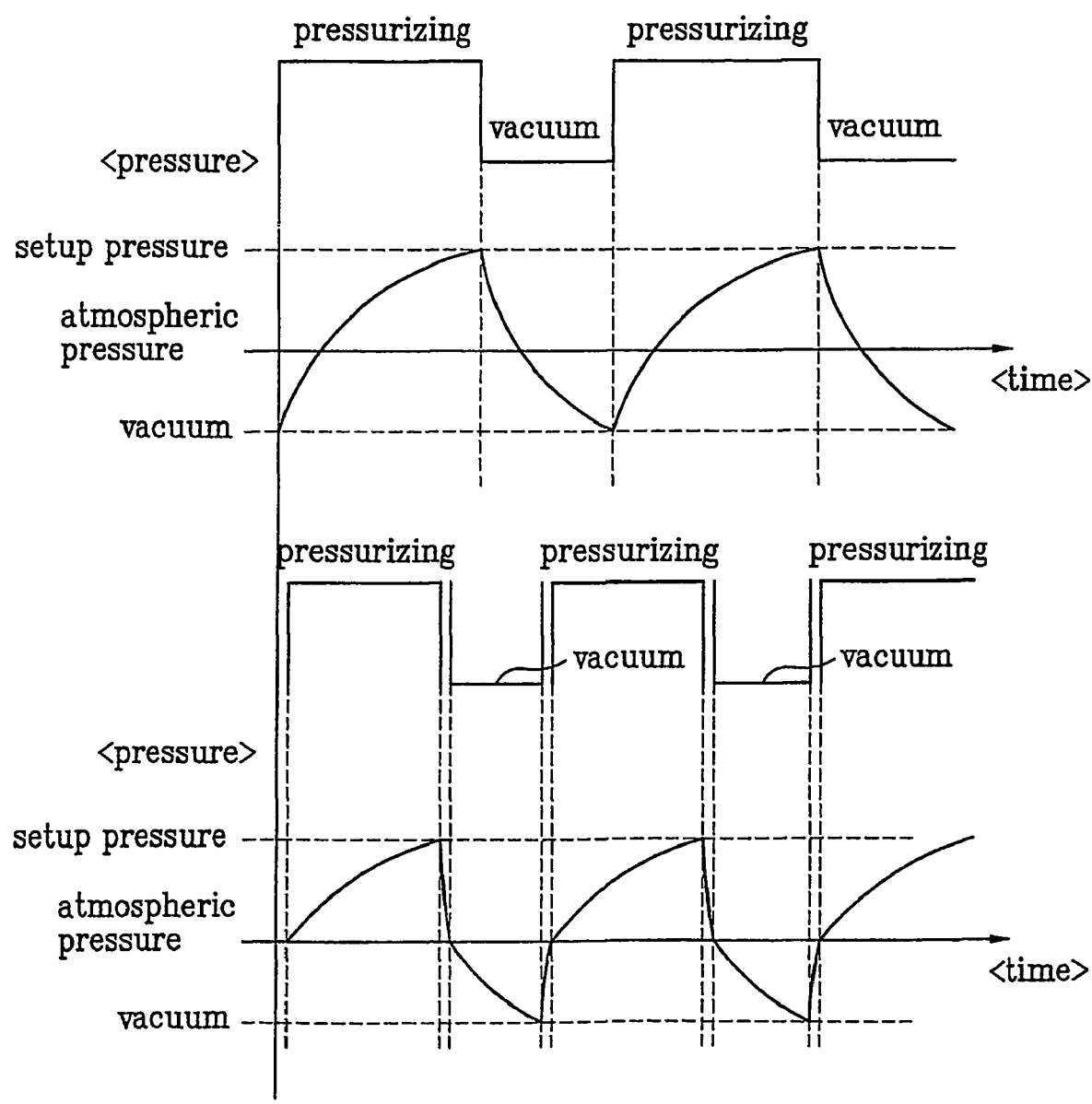

As explained in the foregoing description, times taken to reach the setup pressures and the vacuum states are reduced by the oxygen generating method according to the present invention. The time taken to maintain the setup pressures and the setup vacuum states are extended relatively under the pressure time Tc and the decompressing time Tv, thereby enabling to increase the setup pressure and the degree of vacuum as well as the generating amount and concentration of oxygen. Besides, as shown in FIG. 15B, it is able to increase the generating amount and concentration of oxygen by repeating the decompressing and pressurizing steps more frequently within the same time by shortening the pressurizing time Tc and the vacuum time Tv.

Meanwhile, prior to the decompressing and pressurizing steps, a gas sensor measuring a gas concentration in a room may be used as the signal output part 128 instead of the timer. And, an oxygen generating method using the gas sensor according to a second embodiment of the present invention is shown in FIG. 16.

Figure 16:
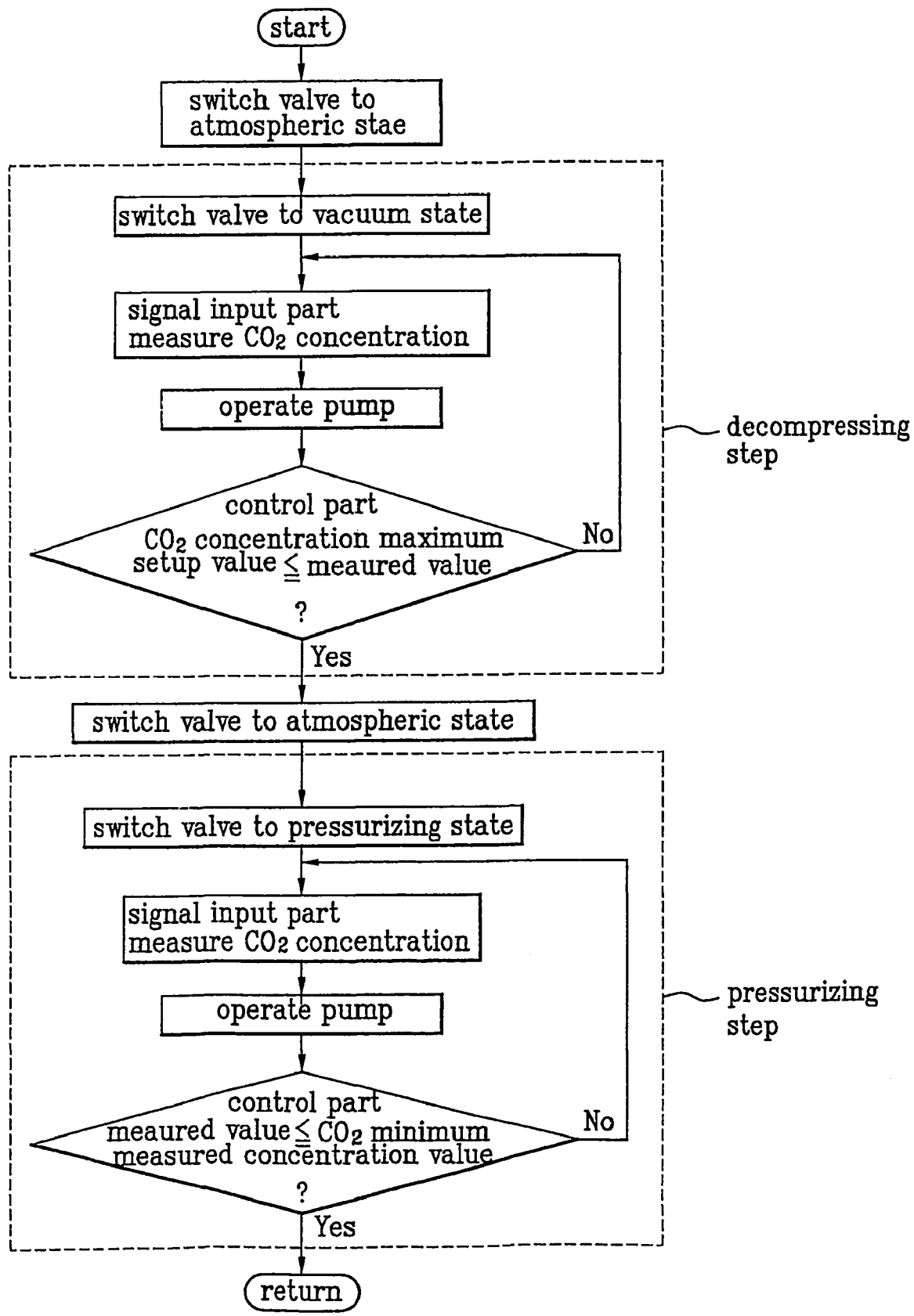
FIG. 16 illustrates a flowchart of generating oxygen in an air conditioner according to a second embodiment of the present invention.

FIG. 16 illustrates a flowchart of generating oxygen in an air conditioner according to a second embodiment of the present invention.

In a decompressing step of the second embodiment of the present invention, after the termination of an initial atmospheric adjustment step, the switch valves 122a and 122b are switched by the control part 127 like the switch step in the first embodiment of the present invention so as to form an air discharge fluid path from the adsorption tower 123 to the second air tube 126b.

Thereafter, a gas concentration in a room is measured by the signal output part 128 so as to be outputted to the control part 127. The control part 127 then actuates the pump 121. In the second embodiment, the signal output part 128 enables to sense various kinds of gases, and a concentration of carbon dioxide relating to a degree of cleanness is preferably measured by the signal output part 128. The inner part of the adsorption tower 123 is decompressed during the operation of the pump 121, whereby nitrogen detached from the adsorbent Z is discharged externally along the provided fluid path.

Meanwhile, if the concentration of carbon dioxide measured by the signal output part 128 is below a maximum concentration of carbon dioxide set up in the control part 127 for the following comparison step in the control part 127, the relative oxygen concentration in the room is proper. Hence, the control part 127 maintains the operation of the pump 121 so as to keep on decompressing. If the measured carbon dioxide concentration is over the setup maximum concentration of carbon dioxide, the oxygen concentration in the room is decreased relatively. Accordingly, an atmospheric adjustment step is carried out so as to prepare a pressure status suitable for carrying out a pressurizing step to increase the oxygen concentration in the room.

After the atmospheric adjustment step has been carried out for a predetermined time, in the following pressurizing step, the switch valves 122a and 122b forms an air inhale path extending to the adsorption tower 123 by the same method of the switching step for pressurization of the first embodiment.

The gas concentration in the room is then measured by the signal output part 128, and the pump 121 is actuated so as to generate oxygen by the pressurization of the inner part of the adsorption tower 123.

When the carbon dioxide concentration measured by the signal output part 128 exceeds a minimum carbon dioxide concentration set up in the control part 127 at the comparison step, the control part 127 maintains the operation of the pump 121 to increase the oxygen concentration in the room. If the measured carbon dioxide concentration is lower than the minimum carbon dioxide concentration, the oxygen concentration in the room is sufficient. Therefore, an atmospheric adjustment step as a preliminary step is carried out for pressure compensation prior to a decompressing step.

As mentioned in the above explanation of the second embodiment of the present invention, the maximum and minimum carbon dioxide concentrations are established and the pressurizing and vacuum steps are repeated within the concentration range between the setup maximum and minimum concentrations. Thus, an optimal oxygen concentration is maintained in the room. Besides, the prior atmospheric adjustment step for switching the pressure state is carried out for a predetermined time as does the first embodiment, thereby shortening greatly the time taken to reach the setup pressure and vacuum states.

As an oxygen generating method according to a third embodiment of the present invention, a key input part outputting a control signal in direct may be used as the signal output part 128 instead of the foregoing described timer for the decompressing and pressurizing steps.

Using the key input part, a user enables to select the pressurizing state or the vacuum state directly by judging the air state in a room, and the control part 127 carries out the pressurizing or decompressing step in accordance with the signal inputted from the key input part. As a matter of fact, the atmospheric step is carried out for switching such a direct pressure state in the third embodiment of the present invention, whereby the time taken to reach the setup pressure or vacuum state is shortened as is described in the foregoing first or second embodiment of the present invention.

Finally, oxygen generated from a series of the oxygen generating process is transported to the oxygen exhauster 200 through the oxygen transport tube 300, and then discharged from the indoor module 20 to a room during the oxygen discharge process with the air cooled by the air conditioning process.

The foregoing explained oxygen supply process and the air conditioning process are carried out simultaneously in the air conditioner according to the present invention. Instead, the oxygen supply process may be carried out independently with the necessity of a user so as to supply a room with oxygen only.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

INDUSTRIAL APPLICABILITY

The present invention has many advantages and merits as follows.

First, the air conditioner according to the present invention has the structure enabling to supply a room with oxygen effectively.

In accordance with the separate structure of the air conditioner, the oxygen generating module includes the oxygen generator and the oxygen exhauster, which are combined with the outdoor module and the indoor module, respectively. The air conditioner enables to have the oxygen supply capacity by the oxygen generating module optimized for the air conditioner structure without altering the structure additionally. Besides, as the oxygen exhauster is just built in the indoor module, the air conditioner has the oxygen supply capacity without increasing the structural volume and decreasing room efficiency.

Second, a performance of the oxygen generating module inside the air conditioner is substantially improved.

The oxygen generating module according to the present invention is inter-connected to the air conditioner to operate in part so as to have various merits. Namely, a the oxygen transport tube is arranged neat the refrigerant tube of low pressure/temperature and the oxygen exhauster is placed in front of or at a rear of the evaporator, the generated oxygen becomes fresher to be supplied with. Moreover, components of the driving part are arranged near the compressor, thereby enabling to increase an efficiency of oxygen generation by the inhaled air of high temperature.

Third, the perfectly-sealed switch valves are used for the present invention, thereby enabling to minimize the pressure loss during the switching operation.

The switch valves according to the present invention prevent a pressure decrease inside the adsorption tower during operation as well as secure a constant oxygen generating flow. Moreover, the switch valves according to the present invention operate sensitively to a pressure variation using the horizontal materials made of flexible materials, thereby being applicable to a use in low pressure.

Fourth, the preliminary step of compensating a pressure for switching the pressure state is applied to the oxygen generating process, thereby enabling to increase the oxygen generating performance.

Namely, the present invention introduces the atmospheric adjustment step between the pressurizing and decompressing steps so as to shorten the time taken to reach the setup pressure state or the vacuum state. The time taken to maintain the setup pressure or vacuum state is increased relatively if the pressurizing and vacuum periods are maintained uniformly. Therefore, it is able to increase the pressurizing pressure or a degree of vacuum so as to increase the oxygen generating amount and oxygen concentration. Moreover, the number of repetition of the respective steps is increased within a fixed time by reducing the time for the pressurizing and decompressing steps.

Further, the oxygen generator is pressurized or form a vacuum at an atmospheric pressure, thereby enabling to restrain the impact occurring instantly to the pump by the abrupt transition between pressurization and vacuum as well as improve durability and operational stability of the oxygen generator.

The invention claimed is:

1. An air conditioner comprising;
    an outdoor module including a condenser, an outdoor fan, and a compressor so as to condense a refrigerant;
    an indoor module including an evaporator, an indoor fan, an inlet, and an outlet so as cool to discharge air in a room;
    a refrigerant tube connecting the evaporator to the condenser so as to circulate the refrigerant; and
    an oxygen generating module comprising:
        an oxygen generator installed at the outdoor module and generating oxygen by in-taking external air; the oxygen generator including a driving part comprising a plurality of components so as to generate the oxygen and an exterior part protecting the driving part, and the oxygen generator being placed at the top of the outdoor module so as to be separated therefrom,
        an oxygen exhauster installed in the indoor module and discharging the oxygen; and
        an oxygen transport tube transporting the oxygen generated from the oxygen generator to the oxygen exhauster, wherein the oxygen generator and the oxygen exhauster are separated from each other in and outside the room, respectively so as to supply the room with the oxygen without altering a structure of the air conditioner.

2. The air conditioner of claim 1, the driving part comprising: an
    adsorption tower charged with a predetermined adsorbent;
    an air pump circulating air compulsorily so as to provide the adsorption tower with a pressurizing or vacuum state;
    first and second switch valves connected to an entrance and an exit of the air pump, respectively, connected to an entrance of the adsorption tower, and providing air fluid paths selectively so as to intake the external air and discharge internal air;
    a check valve installed at the oxygen transport tube connected to the exit of the adsorption tower so as to permit a flow in a discharging direction only;
    a first fluid path connecting the entrance of the air pump, the first switch valve, and the entrance of the adsorption tower reciprocally;
    a second fluid path connecting the exit of the air pump, the second switch valve, and the entrance of the adsorption tower reciprocally;
    a first air tube diverging from the first switch valve on the first fluid path so as to be interconnected to an external atmosphere; and
    a second air tube diverging from the second switch valve on the second fluid path so as to be interconnected to the external atmosphere,
    wherein the oxygen is generated from an inflow of air or nitrogen is detached from the adsorbent in accordance with the pressurizing or vacuum state of the adsorption tower.

3. The air conditioner of claim 2, further comprising a control part controlling operations of the first and second switch valves and the pump so that the driving part makes an inner part of the adsorption tower be in the pressurizing or vacuum state.

4. The air conditioner of claim 3, further comprising a signal output part outputting a predetermined signal to the control part so that the driving part controls a relating operation part.

5. The air conditioner of claim 4, wherein the signal output part is a timer measuring a time after a switching operation for pressure state variation at the inner part of the adsorption tower.

6. The air conditioner of claim 4, wherein the signal output part is a gas sensor measuring a concentration of a predetermined gas in the room.

7. The air conditioner of claim 6, wherein the predetermined gas measured by the sensor is carbon dioxide.

8. The air conditioner of claim 4, wherein the signal output part is a key input part outputting an operational signal to the control part in direct by a user's manipulation.

9. The air conditioner of claim 3, wherein the control part repeats the pressurizing and vacuum states at the inner part of the adsorption tower periodically in accordance with a setup time.

10. The air conditioner of claim 9, wherein the first and second switch valves connect the air tubes coupled with themselves and the pump each other or the adsorption tower and the pump each other.

11. The air conditioner of claim 3, wherein the control part repeats the pressurizing and vacuum states periodically so as to maintain an atmospheric state for a predetermined time prior to the pressurizing and vacuum states where the control part maintains the inner part of the adsorption tower for a predetermined time as an atmospheric state prior to the pressurizing and vacuum states.

12. The air conditioner of claim 11, wherein the first and second switch valves connect selectively two of the air tubes connected to the first and second switch valves, the pump, and the adsorption tower.

13. The air conditioner of claim 2, the first switch valve comprising:
   a case body having a vertical wall partitioning one inner end;
   horizontal materials installed at spaces partitioned by the vertical wall respectively and having inflow holes and outflow holes through which air flows in and out respectively;
   first and second inhale tubes interconnected to the inflow holes, respectively;
   a discharge tube interconnected to the respective outflow holes in common; and
   an opening/shutting means opening and shutting the respective outflow holes.

14. The air conditioner of claim 2, the second switch valve comprising:
   a case body having a vertical wall partitioning one inner end;
   horizontal materials installed at spaces partitioned by the vertical wall respectively and having inflow holes and outflow holes through which air flows in and out respectively;
   an intake tube interconnected to the respective inflow holes in common;
   first and second discharge tubes interconnected to the outflow holes, respectively; and
   an opening/shutting means opening and shutting the respective outflow holes.

15. The air conditioner of claim 13, wherein the first intake tube and the second intake tube are connected to the external atmosphere and the adsorption tower, respectively and wherein the discharge tube is connected to the entrance of the pump.

16. The air conditioner of claim 14, wherein the inhale intake tube is connected to the exit of the pump and wherein the first and second discharge tubes are connected to the adsorption tower and the external atmosphere.

17. The air conditioner of one of claim 13 and claim 14, the opening/shutting means comprising:
   opening/shutting materials opening and shutting the outflow holes, respectively;
   electromagnetic materials moving the opening/shutting materials by electromagnetic force, respectively; and
   elastic materials returning the opening/shutting materials to original positions, respectively.

18. The air conditioner of claim 17, wherein packing materials are coupled with tips of the opening/shutting materials, respectively.

19. The air conditioner of one of claim 13 and claim 14, wherein each of the horizontal materials is made of a flexible substance.

20. The air conditioner of claim 19, wherein a figure-maintaining material is coupled with each of the horizontal materials so as to sustain a figure of the corresponding horizontal material.

21. The air conditioner of claim 2, wherein the first and second air tubes merge into one so as to be interconnected to the external atmosphere.

22. The air conditioner of claim 1, the exterior part of the oxygen generator, comprising:
   a support plate fixed to the top of the outdoor module and supporting the driving part; and
   a housing fixed to the support plate so as to cover to protect the driving part.

23. The air conditioner of claim 22, wherein the support plate comprises a predetermined-sized penetrating hole and the top of the outdoor module has a counter predetermined-sized penetrating hole corresponding to the penetrating hole of the support plate, and wherein the support plate is placed near the compressor inside the outdoor module so that components of the driving part intake air of high temperature through the penetrating holes.

24. The air conditioner of claim 1, wherein the exterior part of the oxygen generator is installed over a driving part of the outdoor module and wherein the exterior part comprises a separating plate supporting to fix the driving part of the oxygen generator and a housing covering to protect the driving parts of the oxygen generator and outdoor module.

25. The air conditioner of claim 24, wherein the separating plate further comprises a penetrating hole having a predetermined size and wherein the separating plate is placed near the compressor so that components of the driving part intake air of high temperature through the penetrating holes.

26. The air conditioner of any one of claims 23, 24 and 25, the outdoor module further comprising a fixing material attached to a surface of the compressor or around the compressor so as to fix the components near the compressor stably.

27. The air conditioner of claim 1, wherein the oxygen exhauster further comprises an oxygen generating display part attached to a surface of the outdoor module and connected to the oxygen transport tube so as to display an oxygen exhaust status.

28. The air conditioner of claim 27, the oxygen generating display part comprising:
   a body of which one end is connected to the oxygen transport tube and of which other end is connected to the oxygen exhauster wherein an oxygen fluid path is formed between both of the ends;
   a transparent window attached at a front of the body so as to show the oxygen path of the body; and
   a float inserted to float in the oxygen fluid path in accordance with a flow of the oxygen.

29. A method of generating oxygen in an air conditioner, comprising the steps of:
   adjusting an inner part of an adsorption tower to have an atmospheric state by interconnecting the adsorption tower to an external atmosphere when an oxygen generating module is actuated;
   decompressing the inner part of the adsorption tower to have a setup degree of vacuum so as to detach nitrogen from an adsorbent in the adsorption tower;
   readjusting the inner part of the adsorption tower to have the atmospheric state by interconnecting the adsorption tower to the external atmosphere; and
   pressurizing the inner part of the adsorption tower to have a setup pressure so as to extract oxygen from air using the adsorbent.

30. The method of claim 29, wherein the decompressing step and the pressurizing step are carried out in reverse order where the pressurizing step is carried out after the atmospheric adjustment step and the decompressing step is carried out after the atmospheric readjustment step.

31. The method of claim 29, wherein the decompressing, atmospheric adjustment, and pressurizing steps are repeated in order when the oxygen generating module operates.

32. The method of claim 29, wherein the atmospheric adjustment, decompressing, and pressurizing steps are controlled by a predetermined control part and a signal output part measuring a time after an operational control by the control part.

33. The method of claim 32, the atmospheric adjustment and readjustment steps comprising the steps of:
  switching switch valves so that the adsorption tower is interconnected to the external atmosphere in direct by the control part;
  outputting a time after switching the switch valves which is measured by the signal output part to the control part; and
  maintaining the inner part of the adsorption tower to have the atmospheric state for a setup time by comparing the setup time in the control part to the measured time of the signal output part.

34. The method of claim 32, the decompressing step comprising the steps of:
  switching switch valves so as to form a fluid path extending from the adsorption tower to an external air through a pump by the control part;
  measuring a time after the switching step by the signal output part;
  operating the pump so that an internal air of the adsorption tower is discharged along the fluid path; and
  maintaining to operate the pump for a setup decompressing time by comparing the setup decompressing time in the control part to the measured time of the signal output part.

35. The method of claim 32, the pressurizing step comprising the steps of:
  switching switch valves so as to form a fluid path extending from an external air to the adsorption tower through a pump by the control part;
  measuring a time after the switching step by the signal output part;
  operating the pump so that the adsorption tower is supplied with the external air along the fluid path; and
  maintaining to operate the pump for a setup pressurizing time by comparing the setup pressurizing time in the control part to the measured time of the signal output part.

36. The method of claim 29, wherein the decompressing and pressurizing steps are controlled by a predetermined control part and a signal output part measuring a gas concentration in a room.

37. The method of claim 36, the decompressing step comprising the steps of:
  switching switch valves so as to form a fluid path extending from the adsorption tower to an external air through a pump by the control part;
  measuring the gas concentration in the room after the switching step by the signal output part;
  operating the pump so that an internal air of the adsorption tower is discharged along the fluid path; and
  maintaining to operate the pump to reach a setup maximum gas concentration by comparing the setup maximum gas concentration in the control part to the measured concentration of the signal output part.

38. The method of claim 36, the pressurizing step comprising the steps of:
  switching switch valves so as to form a fluid path extending from an external air to the adsorption tower through a pump by the control part;
  measuring the gas concentration in the room after the switching step by the signal output part;
  operating the pump so that the adsorption tower is supplied with the external air along the fluid path; and
  maintaining to operate the pump to reach a setup minimum gas concentration by comparing the setup minimum gas concentration in the control part to the measured gas concentration of the signal output part.

39. The method of claim 29, wherein the decompressing and pressurizing steps are controlled by a predetermined control part and a signal output part enabling a user to select the decompressing step and the pressurizing step in direct.

40. A switching apparatus in an oxygen generator, comprising:
  a first switch valve comprising:
    a case body having a vertical wall partitioning one inner end;
    horizontal materials installed at spaces partitioned by the vertical wall respectively and having inflow holes and outflow holes through which air flows in and out respectively;
    first and second intake tubes interconnected to the inflow holes, respectively;
    a discharge tube interconnected to the respective outflow holes in common; and
    an opening/shutting means opening and shutting the respective outflow holes; and
  a second switch valve comprising:
    a case body having a vertical wall partitioning one inner end;
    horizontal materials installed at spaces partitioned by the vertical wall respectively and having inflow holes and outflow holes through which air flows in and out respectively;
    an intake tube interconnected to the respective inflow holes in common;
    first and second discharge tubes interconnected to the outflow holes, respectively; and
    an opening/shutting means opening and shutting the respective outflow holes, wherein the first and second switch valves are installed at an air intake side and an air discharge side, respectively.

41. The apparatus of claim 40, wherein the first intake tube and the second intake tube are connected to an external atmosphere and an adsorption tower, respectively, and wherein the discharge tube is connected to an entrance of the pump.

42. The apparatus of claim 40, wherein the intake tube is connected to an exit of the pump and wherein the first and second discharge tubes are connected to the adsorption tower and the external atmosphere.

43. The apparatus of claim 40, the opening/shutting means comprising:
  opening/shutting materials opening and shutting the outflow holes, respectively;
  electromagnetic materials moving the opening/shutting materials by electromagnetic force, respectively; and
  elastic materials returning the opening/shutting materials to original positions, respectively.

44. The apparatus of claim 40, wherein packing materials are coupled with tips of the opening/shutting materials, respectively.

45. The apparatus of claim 40, wherein each of the horizontal materials is made of a flexible substance.

46. The apparatus of claim 4, wherein a figure-maintaining material is coupled with each of the horizontal materials so as to sustain a figure of the corresponding horizontal material.

* * * * *